United States Patent
Shannon et al.

(10) Patent No.: US 11,397,192 B2
(45) Date of Patent: Jul. 26, 2022

(54) ACOUSTIC AIRSPEED SENSORS AND PROCESSING TECHNIQUES

(71) Applicant: Rockwell Collins, Inc., Cedar Rapids, IA (US)

(72) Inventors: Daniel W. Shannon, Glastonbury, CT (US); Sudarshan N. Koushik, West Hartford, CT (US); Todd Anthony Ell, Savage, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 62 days.

(21) Appl. No.: 17/090,453

(22) Filed: Nov. 5, 2020

(65) Prior Publication Data

US 2022/0137084 A1    May 5, 2022

(51) Int. Cl.
*G01P 5/24* (2006.01)
*G01P 13/02* (2006.01)
*G01K 11/24* (2006.01)

(52) U.S. Cl.
CPC .............. *G01P 5/245* (2013.01); *G01K 11/24* (2013.01); *G01P 13/025* (2013.01)

(58) Field of Classification Search
None
See application file for complete search history.

(56) References Cited

U.S. PATENT DOCUMENTS

| 4,038,870 | A |   | 8/1977 | Rotier |
| 5,585,557 | A |   | 12/1996 | Loschke et al. |
| 5,979,234 | A |   | 11/1999 | Karlsen |
| 7,389,187 | B2 |   | 6/2008 | Kersey et al. |
| 8,261,610 | B2 | * | 9/2012 | Choisnet ................. G01P 13/02 |
|   |   |   |   | 73/170.13 |

(Continued)

FOREIGN PATENT DOCUMENTS

| CN | 109633200 A | 4/2019 |
| CN | 110286390 A | 9/2019 |

(Continued)

OTHER PUBLICATIONS

Schwartz, Heidi et al., "Application of ultrasound for the estimation of flight velocity direction on an aircraft fuselage", Applied Acoustics, 90 (2015), pp. 171-180.

(Continued)

*Primary Examiner* — Peter J Macchiarolo
*Assistant Examiner* — Jermaine L Jenkins
(74) *Attorney, Agent, or Firm* — Suiter Swantz pc llo

(57) ABSTRACT

An acoustic airspeed sensor system can include at least one acoustic transmitter configured to provide an acoustic pulse, a plurality of acoustic receivers including at least a first acoustic receiver, a second acoustic, receiver, and a third acoustic receiver, each positioned at a first radial distance from the at least one acoustic transmitter. The first acoustic receiver, the second acoustic receiver, and the third acoustic receiver are each configured to receive the acoustic pulse at a first time, a second time, and a third time, respectively, and (Continued)

output a first receiver signal, a second receiver signal, and a third receiver signal respectively. The system can include a computation unit operatively connected to the acoustic receivers and configured to generate a propagation function. The computation unit is further configured to determine true air speed based upon a receiver signals and the propagation function.

15 Claims, 14 Drawing Sheets

(56) References Cited

U.S. PATENT DOCUMENTS

| | | | |
|---|---|---|---|
| 9,121,860 B1* | 9/2015 | Cronyn | G01P 3/00 |
| 10,101,443 B1 | 10/2018 | LeGrand, III et al. | |
| 10,739,371 B2 | 8/2020 | Ell | |
| 2016/0305977 A1* | 10/2016 | Genevrier | G01S 7/4813 |
| 2018/0164337 A1* | 6/2018 | Naslund | B64D 43/00 |
| 2020/0057092 A1 | 2/2020 | Ell | |
| 2020/0110110 A1* | 4/2020 | Matheis | G01K 13/02 |
| 2020/0216191 A1 | 7/2020 | Golly et al. | |
| 2020/0256888 A1* | 8/2020 | Ell | G01P 5/245 |

FOREIGN PATENT DOCUMENTS

| | | |
|---|---|---|
| EP | 3663731 A1 | 6/2020 |
| GB | 2500290 A | 9/2013 |
| JP | 3574814 B2 | 10/2004 |

OTHER PUBLICATIONS

Schotland, R. M., "The Measurement of Wind Velocity by Sonic Means", Journal of Meteorology, vol. 12, Nov. 1954, pp. 386-390.
Denis Max F. et al: "Acoustic remote sensing for source localization and atmospheric tomography: Applications of the cross-correlation Green's function retrieval method", The Journal of the Acoustical Society of America, vol. 144, No. 5, Nov. 1, 2018 (Nov. 1, 2018), pp. EL465-EL470, XP055897437, 2 Huntington Quadrangle, Melville, NY 11747 ISSN: 0001-4966, DOI: 10.1121/1.5080461.
Extended Search Report in European Application No. 21206434.9 dated Mar. 14, 2022, 8 pages.

* cited by examiner

ACOUSTIC AIRSPEED SENSORS AND PROCESSING TECHNIQUES

BACKGROUND

In aviation, airspeed is defined as the speed of an aircraft relative to the surrounding air. Airspeed may be reported as an indicated airspeed (IAS) read off of an anemometer. Airspeed may be further reported as calibrated airspeed (CAS), equivalent airspeed (EAS) and true airspeed (TAS), each of which are based upon the initial IAS. Accurate measurement of airspeed is critical for aircraft function, as airspeed affects the lift and drag of aircraft.

The device traditionally used to measure airspeed in an aircraft is the pitot probe, a slender tube with two apertures that determines indirectly a stagnation pressure as moving air is brought to rest (stagnated) when there is no outlet to allow air flow to continue. In practice, the pitot probe is placed in the airstream on the outside of the aircraft, where a front aperture measures a stagnation pressure, and a side aperture measures a static pressure. Differences between the stagnation pressure and the static pressure can then be calculated further to determine airspeed. Pitot probes have a disadvantage in that they may become blocked during flight, particularly by ice, making readings by the pitot probe inaccurate. Inaccurate pitot probes readings can seriously curtail a pilot's ability to fly the aircraft effectively, and may lead to a crash.

Modern aircraft often use different and/or redundant methods/devices to measure airspeed other than pitot probes. To this end, ultrasonic anemometers, also known as acoustic or sonic anemometers, have been developed. These devices, often built flush or near-flush with the outside surface of the aircraft, measure aircraft speed based on the timing of sonic pulses between one or more pairs of transducers, as the time of flight of a sound pulse is modified by the direction of airflow. A rough calculation of airspeed based on ultrasonic anemometer readings may be calculated by measuring differences in the sound propagation by the transducer pairs. Currently, the calculations used to determine air speed do not accurately consider the boundary layer (i.e., the speed of air in the immediate vicinity of the surface of the aircraft), ultimately lessening the accuracy of air speed measurements. Thus, it is desirable to provide a system or method that avoids the shortcomings of conventional approaches.

SUMMARY

An acoustic airspeed sensor system can include at least one acoustic transmitter configured to provide an acoustic pulse, a plurality of acoustic receivers including at least a first acoustic receiver positioned at a first radial distance from the at least one acoustic transmitter and a second acoustic receiver positioned at a second radial distance from the at least one acoustic transmitter, and a third acoustic receiver positioned at a third distance from the at least one acoustic transmitter. The first acoustic receiver is configured to receive the acoustic pulse at a first time and output a first receiver signal. The second acoustic receiver is configured to receive the acoustic pulse at a second time and output a second receiver signal. The third acoustic receiver is configured to receive the acoustic pulse at a third time and output a third receiver signal. The sensor system can include a computation unit operatively connected to the first acoustic receiver, the second acoustic receiver, and the third acoustic receiver. The computation unit is configured to receive the first receiver signal, the second receiver signal and the third receiver signal, determine a first propagation time between receiving the first receiver signal and transmission of the acoustic pulse by the acoustic transmitter, determine a second propagation time between receiving the second receiver signal and transmission of the acoustic pulse by the acoustic transmitter, receive or determine a wind angle, determine a third propagation time between receiving the third receiver signal and transmission of the acoustic pulse by the acoustic transmitter, receive or determine a wind angle, determine an air speed based upon the first propagation time, the second propagation time, and the wind angle, and output an airspeed signal indicative of the airspeed.

In some embodiments of the system, the computation unit includes one or more propagation measurement modules operatively connected to a pulse control module and at least one of the first acoustic receiver, the second acoustic receiver, or the third acoustic receiver. In some embodiments, the pulse control module is operatively connected to the at least one acoustic transmitter and configured to cause the at least one acoustic transmitter to send the acoustic pulse at a send time, wherein the one or more propagation measurement modules are configured to compare the send time and the first time to determine the first propagation time and output first propagation data. In some embodiments, the one or more propagation measurement modules are configured to compare the send time to the second time to determine the second propagation time and output second propagation data, wherein the one or more propagation measurement modules are configured to compare the send time to the third time to determine the third propagation time and output third propagation data.

In some embodiments of the system, the computation unit includes a wind angle module operatively connected to the one or more propagation measurement modules to receive the first propagation data, the second propagation data, and the third propagation data and configured to determine the wind angle based thereon, and to output wind angle data.

In some embodiments of the system, the computation unit includes an airspeed module operatively connected to the wind angle module to receive wind angle data therefrom, wherein the airspeed module is operatively connected to the one or more propagation measurement modules to receive the first propagation data, the second propagation data, and the third propagation data, wherein the airspeed module is configured to determine airspeed based on the wind angle, the first propagation data, the second propagation data, and the third propagation data, and to output an air speed signal.

In some embodiments of the system, the computation unit includes a speed of sound module operatively connected to the airspeed module to receive the airspeed signal, wherein the speed of sound module is operatively connected to the one or more propagation measurement modules to receive the first propagation data, the second propagation data, and the third propagation data, wherein the speed of sound module is operatively connected to the one or more propagation measurement modules to receive the first propagation data, the second propagation data, and the third propagation data, wherein the speed of sound module is operatively connected to the wind angle module to receive the wind angle data, wherein the speed of sound module is configured to determine a speed of sound based on the wind speed data, the first propagation data, the second propagation data, and the third propagation data, and to output speed of sound data.

In some embodiments of the system, the speed of sound module is configured to determine Mach number from the speed of sound and to output a Mach number signal.

In some embodiments of the system, the computation unit includes a static air temperature module operatively connected to the speed of sound module to receive the speed of sound data to determine a static air temperature based on the speed of sound, and to output a static air temperature signal.

In some embodiments of the system, the computation unit includes a multiplexer between the one or more propagation measurement modules and at least one other module of the computation unit, the multiplexer configured to receive and multiplex the first propagation data, the second propagation data, and the third propagation data from the one or more propagation measurement modules.

In some embodiments of the system, two of the first radial distance, the second radial distance, or the third radial distance are equivalent.

In some embodiments of the system, at least one of the first acoustic receiver, the second acoustic receiver, or the third acoustic receiver comprise microelectro-mechanical system microphones.

In some embodiments of the system, the computation unit is configured to determine if an acoustic receiver is shadowed by setting a maximum time for response, and to ignore one or more signals from the shadowed acoustic receivers.

In some embodiments of the system, the processor uses a beamforming algorithm.

In some embodiments of the system, the beamforming algorithm comprises a Classical algorithm, a Capon algorithm, a MUSIC algorithm, a root-MUSIC algorithm, a Bartlett algorithm, an ESPIRIT algorithm, a Min-Norm algorithm, a Burg algorithm, a SAMV algorithm, a Welch algorithm, a Time-Reversal MUSIC algorithm, a MVDR algorithm, an Akaike Information Criteria algorithm, or a Minimum Descriptive Length (MDL) Criteria algorithm.

In some embodiments of the system, the at least one acoustic transmitter and the at least one of the plurality of acoustic receivers are configured as flush mounted on a surface of an aircraft.

A computer implemented method can include emitting an acoustic pulse using at least one acoustic transmitter receiving, at a first time, the acoustic pulse using a first acoustic receiver positioned at a first radial distance from the at least one acoustic transmitter and providing a first receiver signal from the first acoustic receiver in response to receiving the acoustic pulse. The method can include receiving, at a second time, the acoustic pulse using a second acoustic receiver positioned at a second radial distance from the at least one acoustic transmitter and providing a second receiver signal from the second acoustic receiver in response to receiving the acoustic pulse. The method can include receiving, at a third time, the acoustic pulse using a third acoustic receiver positioned at a third radial distance from the at least one acoustic transmitter and providing a third receiver signal from the third acoustic receiver in response to receiving the acoustic pulse. The method can include determining a first propagation time between receiving the first receiver signal and transmission of the acoustic pulse by the at least one acoustic transmitter. The method can include determining a second propagation time between receiving the second receiver signal and transmission of the acoustic pulse by the at least one acoustic transmitter. The method can include determining a third propagation time between receiving the third receiver signal and transmission of the acoustic pulse by the at least one acoustic transmitter. The method can include constructing a propagation function based on at least one of: the location of the at least one acoustic transmitter relative to at least one of the first receiver, the second receiver, the third receiver; the amplitude of the at least one of the first receiver signal, the second receiver signal, or the third receiver signal; or the phase of the at least one of the first receiver signal, the second receiver signal, or the third receiver signal. The method may include receiving or determining a wind angle. The method may further include determining an air speed based on the propagation function and the at least one of the first propagation time, the second propagation time, the third propagation time or the wind angle, and output an airspeed signal indicative of the airspeed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
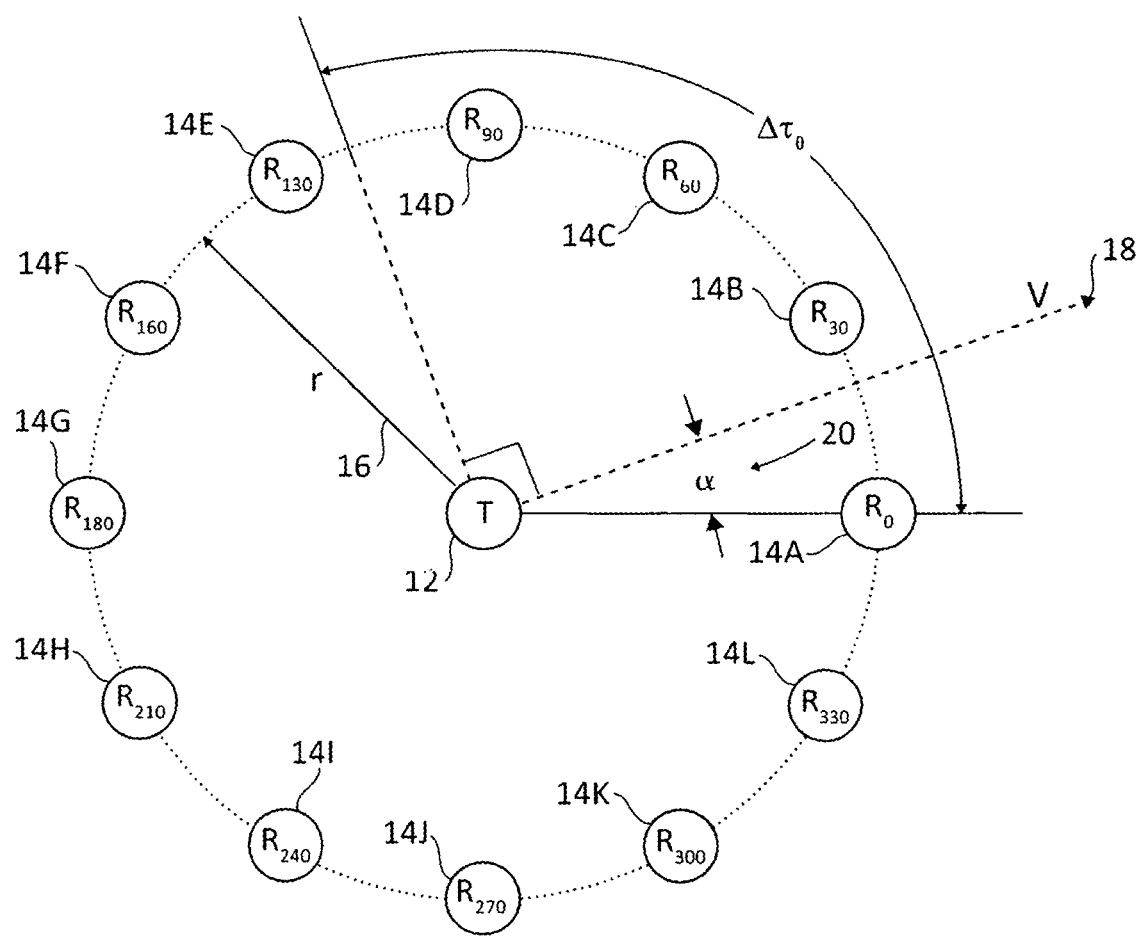
FIG. 1A is a top-down view of an air data sensor, showing an embodiment of transmitter and receiver layout, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Apparatus, systems, and associated methods relate to acoustic air data sensors. Using the apparatus, systems, and associated methods herein, allows for sensing the wind angle (e.g., angle-of-attack, angle of slip, airspeed) without mechanical moving parts or obstructing airflow. Additionally, this allows high bandwidth and update rate measurement of, e.g., wind angle and airspeed.

FIG. 1A is a top-down view of acoustic air data sensor 10 including acoustic transmitter 12, acoustic receivers 14A-14L, radius 16, airflow 18, and wind angle 20 (e.g., angle-of-attack). While certain embodiments may refer to angle-of-attack, one having ordinary skill in the art appreciates that wind angle is what is sensed, which may be angle-of-attack (AOA), angle-of-slip (AOS), or any in-between angle, depending on the local flow conditions (e.g., due to placement of a sensor and operational state of the aircraft).

With respect to determining wind angle (e.g., AOA), acoustic receivers 14A-14L can be placed at a fixed radius (r) around acoustic transmitter 12 in certain embodiments. Acoustic transmitter 12 can be a piezoelectric speaker, cone speaker, microelectro-mechanical systems (MEMS) speaker, or other electric-to-acoustic transducer. Acoustic receivers can be microphones including MEMS microphones, condenser microphones, lasers, or other acoustic-to-electric transducer.

Acoustic receivers 14A-14L can be placed at 0°, 30°, 60°, 90°, 120°, 150°, 180°, 210°, 240°, 270°, 300°, and 330° respectively, as shown. Any other suitable numbering or positioning of receivers is contemplated herein. The time-of-flight (i) or phase modulation of an acoustic pulse emitted by acoustic transmitter 12 can be measured to each of acoustic receivers 14A-14L. For example, the time-of-flight of the acoustic pulse from acoustic transmitter (T) 12 to each of acoustic receivers (Re) 14A-14L placed at angle θ is given by:

$$\tau_\theta = rC_0 + V\cos(\theta - \alpha) \quad \text{(Equation 1)}$$

where $C_0$ is the speed of sound, a is angle-of-attack 20, and V is the airspeed of airflow 18. A similar arrangement of acoustic receivers 14 and transmitters 12 are disclosed in U.S. Pat. No. 10,739,371 entitled "Acoustic Airspeed Sensors", which is incorporated by reference in its entirety.

As shown in Equation 1, time-of-flight is impacted by the airspeed and wind angle 20. The radius r is constant where acoustic receivers 14A-14L are positioned at fixed radius 16 and angle from acoustic transmitter 12. The speed of sound in air is not impacted by wind angle or airspeed. Therefore, for a known airspeed, the only variable impacting the time-of-flight of the acoustic pulse to acoustic receivers 14A-14L is wind angle 20.

Figure 1B:
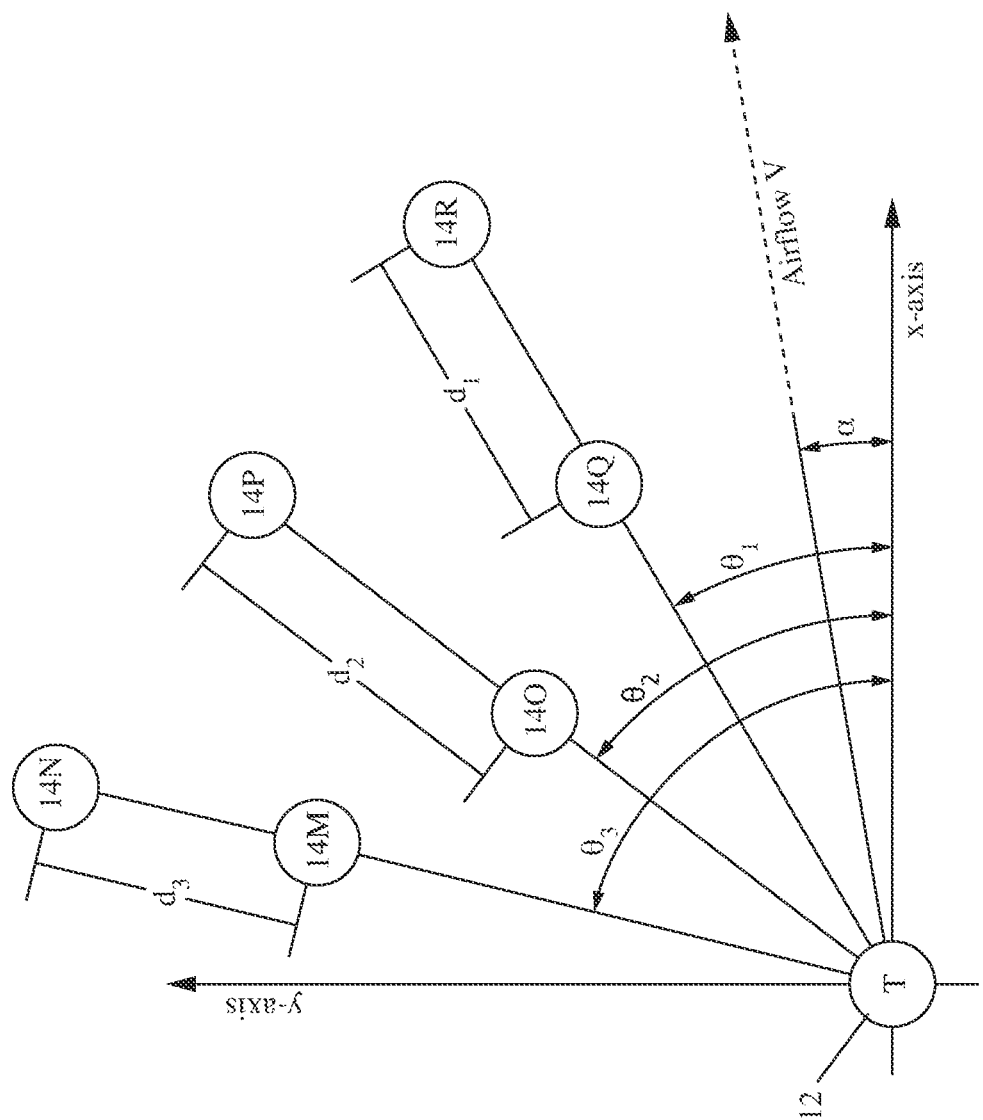
FIG. 1B. is a top-down view of an air data sensor, showing an embodiment of transmitter and receiver layout, in accordance with one or more embodiments of the disclosure.

The acoustic receivers 14 may be placed at any point relative to the transmitter 12 and may have any symmetrical, non-symmetrical or random organization. FIG. 1B is a top down view of a non-symmetrical acoustic air data sensor 21, including transmitter 12, acoustic receivers 14M-14R, airflow 18 and wind angle 20 (e.g., angle-of-attack). Pairs of acoustic receivers (e.g., 14M/14N, 14O/14P. 14Q, 14R) are placed randomly along the surface plane of the non-symmetrical acoustic air data sensor 21 at angles relative to the X-axis (e.g., $\theta_1$, $\theta_2$, and $\theta_3$), with differing distances (e.g., $d_1$, $d_2$, and $d_3$) between each pair of acoustic receivers 14. In some embodiments, the transmitter 12 and two or more acoustic receivers 14 are arranged within a line (e.g., a straight line may pass through the transmitter and two or more acoustic receivers 14, as in FIG. 1B). In some embodiments, only one acoustic receiver 14 is arranged in a line with the transmitter 12. Any arrangement of acoustic receivers 14 and transmitters 12 is possible. Therefore, the above description should not be interpreted as a limitation of the present disclosure, but merely as an illustration.

Figure 2:
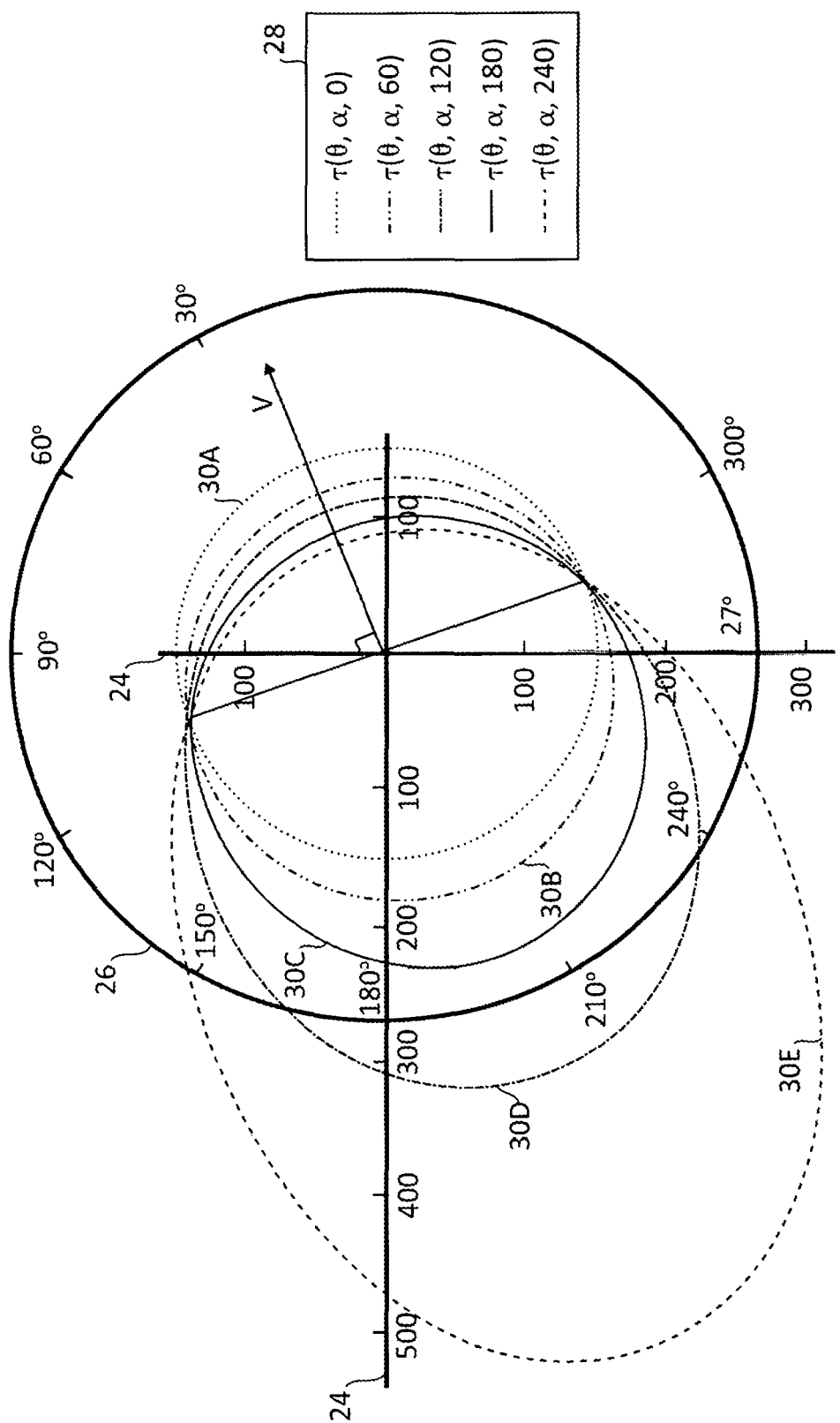
FIG. 2 is a polar plot depicting the time-of-flight between an acoustic transmitter and an acoustic receiver at various air speeds (V=0, 60, 120, 180, and 240 as shown), in accordance with one or more embodiments of the disclosure.

FIG. 2 shows polar plot 22 including radial axis 24, angular axis 26, legend 28, and ellipses 30A-30E. For purposes of clarity and ease of discussion, FIG. 2 is described below within the context of acoustic air data sensor 10 of FIG. 1.

Radial axis 24 indicates the time in micro-seconds. Angular axis 26 indicates the angle in degrees. Legend 28 matches each of ellipses 30A-30E to an airspeed. Ellipses 30A-30E represent the time it takes (time-of-flight) for a pulse to travel from acoustic transmitter 12 to radius 16 based upon angle-of-attack 20 and a given airspeed. Ellipses 30A-30E represent the time-of-flight at airspeeds of 0 meters per second (m/s), 60 m/s, 120 m/s, 180 m/s, and 240 m/s respectively. Ellipses 30A-30E can be derived using Equation 1 with an angle-of-attack of 20°, a radius of 0.05 meters, and a speed of sound of 331.45 m/s.

As shown in FIG. 2, air speed impacts the time-of-flight of the acoustic pulse at all angles except those angles 90° from the wind angle 20. Ellipses 30A-30E have the same time-of-flight at 110° and 290°. At 90° from angle-of-attack 20, the velocity term of Equation 1 is zero. This means that the speed of sound at an angle that is 90° from wind angle 20 can be determined from:

$$C_0 = r/\tau_{\theta 0}.$$ (Equation 2)

Figure 3:
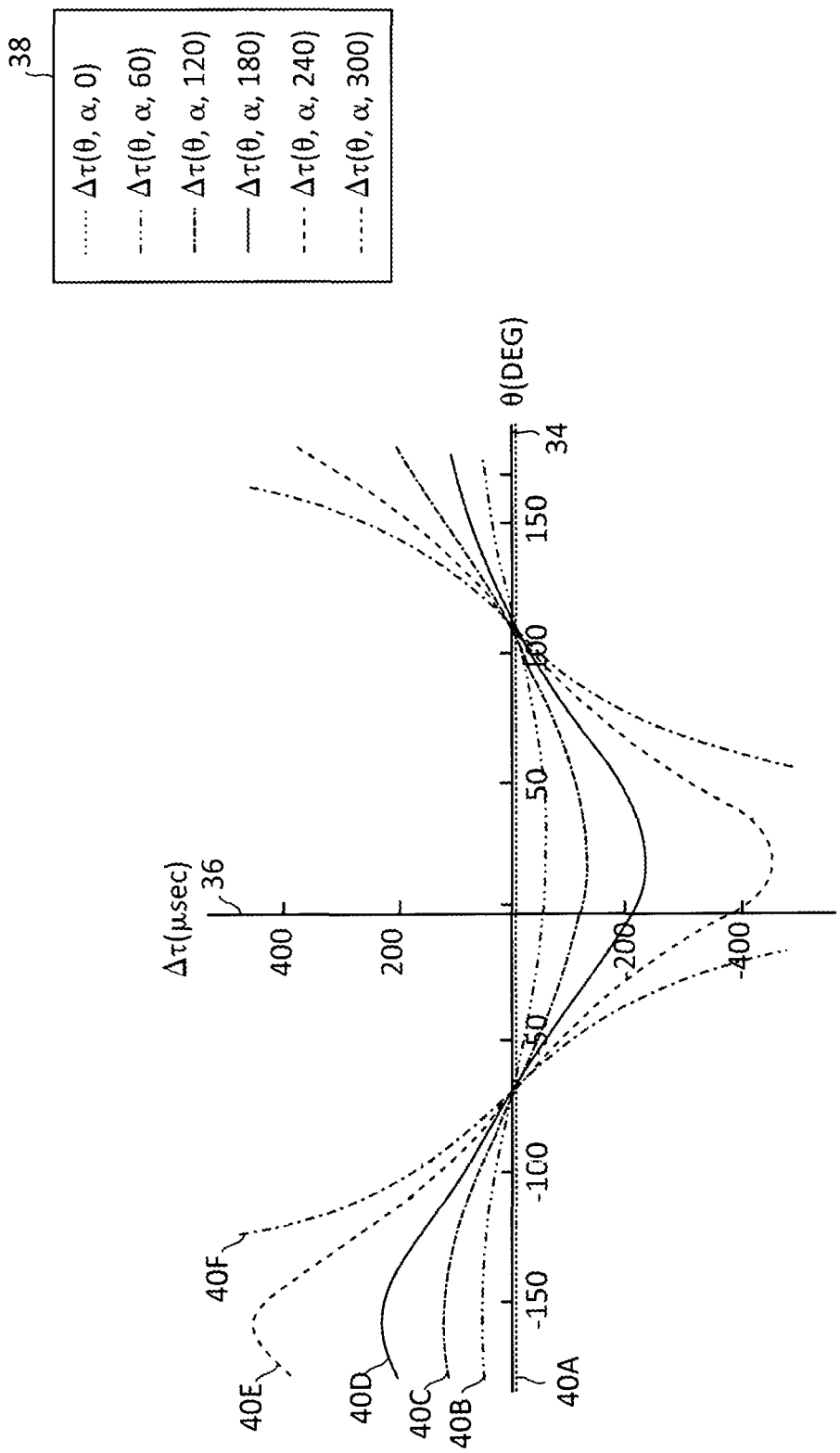
FIG. 3 is a graph depicting the time-of-flight difference between opposing acoustic receivers, in accordance with one or more embodiments of the disclosure.

FIG. 3 is a graph 32 illustrating time-of-flight difference between opposing acoustic receivers including an x-axis 34, a y-axis 36, a legend 38, and curves 40A-40F. Graph 32 depicts the difference in time-of-flight ($\Delta$) between opposing acoustic receivers R6 and R6+180° given by:

$$\Delta\tau_\theta = \tau_\theta - \tau_{\theta+180°},$$ (Equation 3)

with an angle-of-attack of 20° and a radius of 0.05 meters. X-axis 34 depicts the difference in time-of-flight in microseconds. Y-axis 36 depicts the angle in degrees. Legend 38 matches each of curves 40A-40F to a given airspeed. Curves 40A-40F represent the difference in time-of-flight of opposing acoustic receivers at airspeeds of 0 m/s, 60 m/s, 120 m/s, 180 m/s, 240 m/s, and 300 m/s respectively. The zero-crossing of each of curves 40A-40F occurs at 90° from the angle-of-attack. Curves 40A-40F can be represented by polynomials. The polynomials will equal zero at 90° from the angle of attack.

Figure 4:
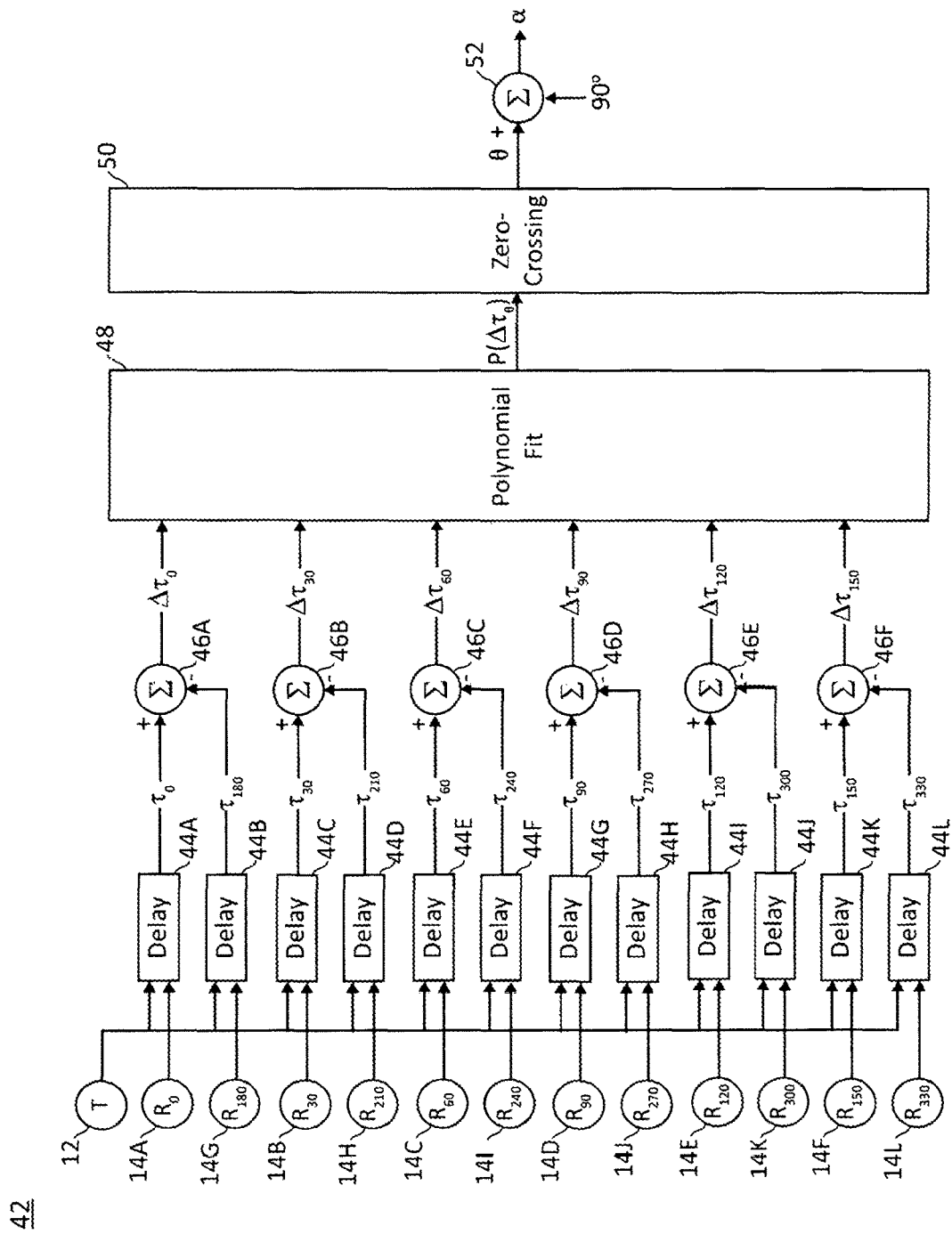
FIG. 4 is a system and software block diagram for a first example of an acoustic air data sensor, in accordance with one or more embodiments of the disclosure.

FIG. 4 shows system diagram 42 for an embodiment of an acoustic wind angle sensor 10 of FIG. 1 including acoustic transmitter 12, acoustic receivers 14A-14L, delay circuitry 44A-44L, difference circuitry 46A-46F, polynomial fit circuitry 48, zero-crossing circuitry 50, and subtraction circuitry 52.

Acoustic transmitter 12 can provide an electrical signal to delay circuitry 44A-44L representing the waveform of a transmitted acoustic pulse. Acoustic receivers 14A-14L can provide signals to delay circuitry 44A-44L representing the waveform of the acoustic pulse received from acoustic transmitter 12. Delay circuitry 44A-44L can extract the delay between the transmitted and received waveforms and provide the extracted delays to difference circuitry 46A-46F. Each of difference circuitry 46A-46F can receive the extracted delays of a pair of opposing (180° apart) acoustic receivers. Difference circuitry 46A-46F can determine the difference in time-of-flight ($\Delta\theta$) between each pair of opposing acoustic receivers and provide the differences to polynomial fit circuitry 48. For clarity, FIG. 4 shows the relative timing of the transmitted and received signals with the delays ($\theta$) and delay differences ($\Delta\theta$) overlaid.

Polynomial fit circuitry 48 can receive the time-of-flight differences or phase differences from difference circuitry 46A-46F. Each time-of-flight difference represents two points, one on either side of zero, because the difference is associated with two acoustic receivers 180° apart. In certain embodiments, polynomial fit circuitry 48 determines the best least-squares polynomial fit about the two points. In another example, polynomial fit circuitry 48 determines the polynomial based upon known curves. Acoustic receivers 14A-14L can be positioned at known angles (R$\theta$) and known radius 16. Since the variables, except for wind angle and airspeed, for determining the delays and therefore the delay differences are known, the delay difference curves are well established. This can be pictured using curves 40A-40F of FIG. 3 since they depict the difference in time-of-flight ($\Delta$) between opposing acoustic receivers R6 and R6+180° given by Equation 3. Polynomial fit circuitry 48 provides the polynomial (P$\Delta\tau\theta$). Zero-crossing circuitry 50 receives the polynomial from polynomial fit circuitry 48. Zero-crossing circuitry 50 determines the angle where the polynomial crosses zero. Zero-crossing circuitry 50 provides the angle where the polynomial crosses zero to subtraction circuitry 52. Subtraction circuitry 52 receives the angle from zero-crossing circuitry 50. Subtraction circuitry 52 determines the wind angle ($\alpha$) by subtracting 90° from the angle provided by zero-crossing circuitry 50. Delay circuitry 44A-44L, difference circuitry 46A-46F, polynomial fit circuitry 48, zero-crossing circuitry 50, and subtraction circuitry 52 as described herein, can be implemented in hardware and/or software.

Figure 5:
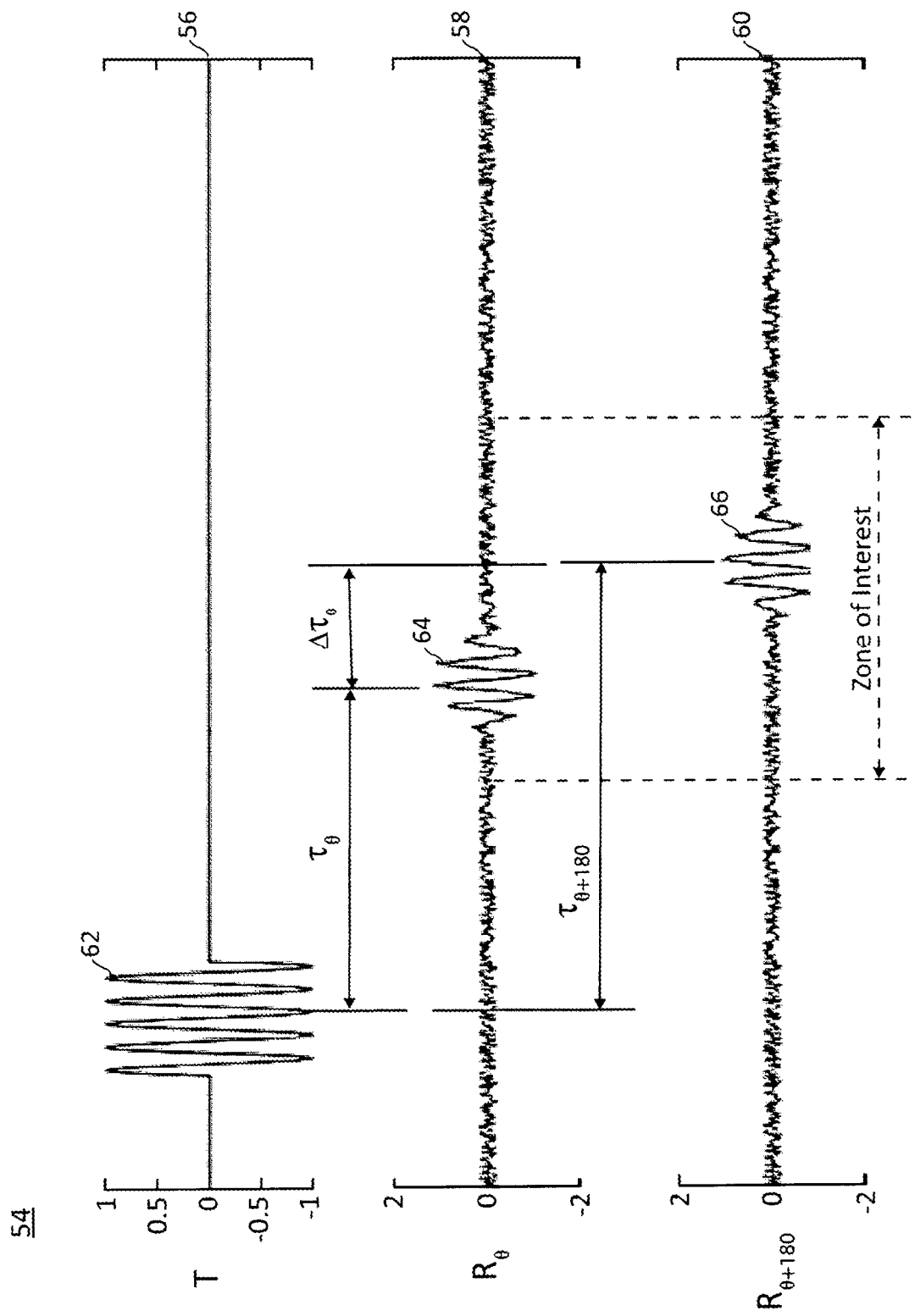
FIG. 5 is a pulse timing diagram of an acoustic air data sensor, in accordance with one or more embodiments of the disclosure.

FIG. 5 is pulse timing diagram 54 including acoustic transmitter waveform 56, acoustic receiver waveform 58, and opposing acoustic receiver waveform 60. Acoustic transmitter waveform 60 can include acoustic transmitter pulse 62. Acoustic receiver waveform 58 can include acoustic receiver pulse 64. Opposing acoustic receiver waveform 60 can include opposing acoustic receiver pulse 66.

Acoustic transmitter pulse 62 represents the acoustic pulse emitted by acoustic transmitter of an acoustic angle-of-attack sensor. Acoustic receiver pulse 64 represents the acoustic pulse sensed by a first acoustic receiver. Opposing acoustic receiver pulse 66 represents the acoustic pulse sensed by a second acoustic receiver, 180° from the first acoustic receiver, or opposing the first acoustic receiver. The timing diagram shows the time between the transmission of an acoustic pulse from the acoustic transmitter and the time the acoustic pulse is sensed by each of the first and second acoustic receivers. The zone-of-interest represents a time period that acoustic receiver pulse 64 and opposing receiver pulse 66 are received in. Acoustic receiver pulses from other acoustic receivers may be similarly characterized (e.g., such as a pulse from a third acoustic receiver).

Figure 6:
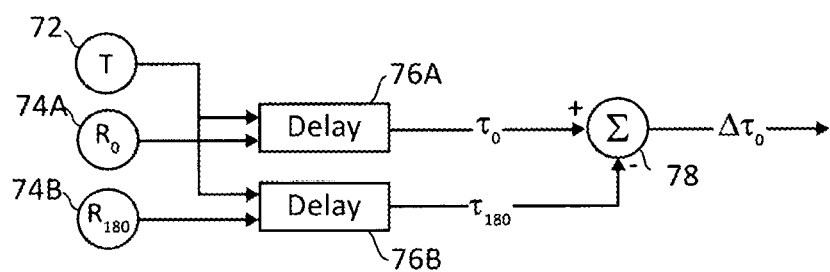
FIG. 6 depicts equivalent subsystems of an acoustic air data sensor, in accordance with one or more embodiments of the disclosure.
Figure 6:
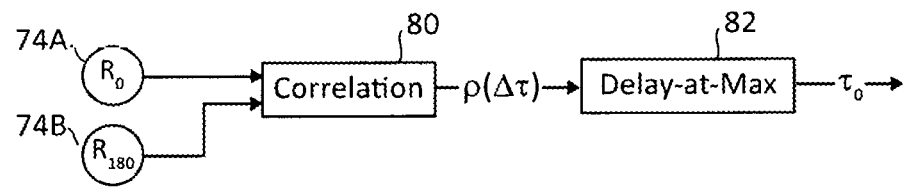

FIG. 6 depicts subsystems of two different embodiments of an acoustic air data sensor, including delay subsystem 68 and cross-correlation subsystem 70. Delay subsystem 68 includes acoustic transmitter 72, acoustic receivers 74A and 74B, delay circuitry 76A and 76B, and difference circuitry 78. Cross-correlation subsystem 70 includes acoustic receivers 74A and 74B, cross-correlation circuitry 80, and max delay circuitry 82.

Delay subsystem 68 and cross-correlation subsystem 70 can be used interchangeably in an acoustic wind angle sensor. Delay subsystem 68 represents a subsystem the acoustic angle-of-attack sensor system of system diagram 42 of FIG. 4. Acoustic transmitter 72 is representative of acoustic transmitter 12, acoustic receivers 74A and 74B are representative of acoustic receivers 14A and 14G, delay circuitry 76A and 76B are representative of delay circuitry 16A and 16B, and difference circuitry 78 is representative of difference circuitry 18A. Delay subsystem 68 uses delay circuitry 76A and 76B to determine the individual delays between the emission of an acoustic pulse by acoustic transmitter 72 and the reception of the acoustic pulse by acoustic receivers 74A and 74B. Difference circuitry 78 determines the delay difference (τθ) between acoustic receivers 74A and 74B based upon the individual delays.

In contrast, cross-correlation subsystem 70 uses cross-correlation circuitry 80 to produce a correlation signal (ρ) using signals provided by acoustic receivers 74A and 74B. The correlation signal represents a cross-correlation function of the signals provided by the acoustic receivers. Cross-correlation functions indicate how alike two signals are based upon shifting one of the signals a given amount in time. As shown in Delay-at-Max delay circuitry 82 can determine a peak correlation of the correlation signal which corresponds to the delay difference (τθ). This can be seen in FIG. 5, that shifting opposing receiver waveform 60 left on the time axis a time equal to the delay difference would cause acoustic receiver pulse 64 and opposing acoustic receiver pulse 66 to align causing the greatest correlation between the two signals. Correlation circuitry 80 and max delay circuitry 82 can be used in place of delay circuitry 76A and 76B and difference circuitry 78, for example. In some embodiments, correlation circuitry 80 may be used in place of delay circuitry 76A, 76B and difference circuitry 78.

Figure 7:
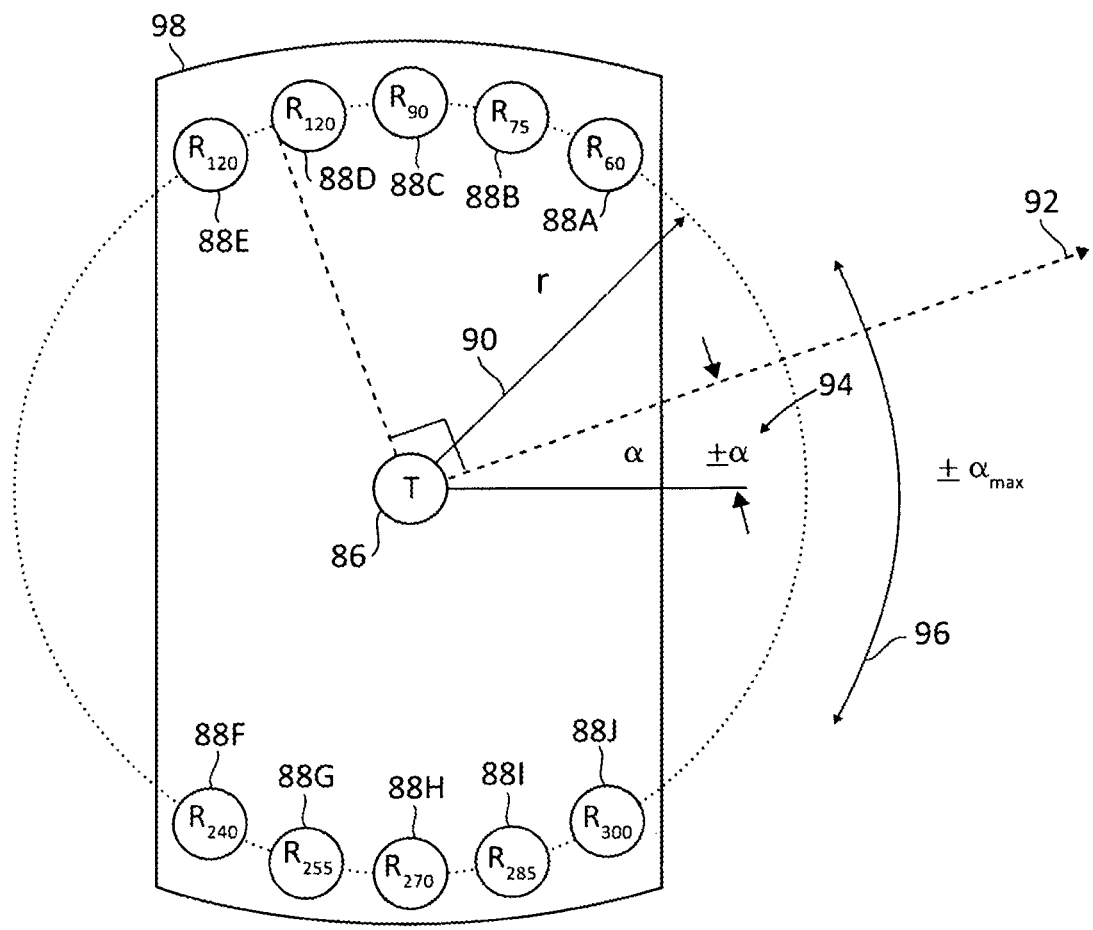
FIG. 7 is a top-down view of an acoustic air data sensor with unrestricted airflow, in accordance with one or more embodiments of the disclosure.

FIG. 7 is a top-down view of one example of acoustic air data sensor 84 that can be used when the wind angle for a given use has a known limited range. In this example, wind angle limit 96 is ±30°. Acoustic angle-of-attack sensor 84 includes acoustic transmitter 86, acoustic receivers 88A-88J, radius 90, airflow 92, angle-of-attack 94, angle-of-attack limit 96, and mounting plate 98.

Acoustic receivers 88A-88J are positioned along radius 90 orthogonal to wind angle limit 96. Such embodiments allow the use of fewer acoustic receivers and/or more densely populated acoustic receivers without increasing the number of acoustic receivers. As shown, acoustic transmitter 86 and acoustic receivers 88A-88J can be disposed on mounting plate 98. This can allow for simple installation and replacement of acoustic angle-of-attack sensor 84 as the whole sensor can be removed and replaced at once, rather than being embedded in, for example, an aircraft fuselage. In certain embodiments, acoustic transmitter 86 is an ultrasonic transmitter. An ultrasonic transmitter would not be heard by passengers. In certain embodiments, acoustic receivers 88A-88J can include a high pass filter to filter out audible noise. As shown, airflow 92 can be unobstructed across acoustic air data sensor 84, thus reducing airflow disturbance and drag.

Figure 8:
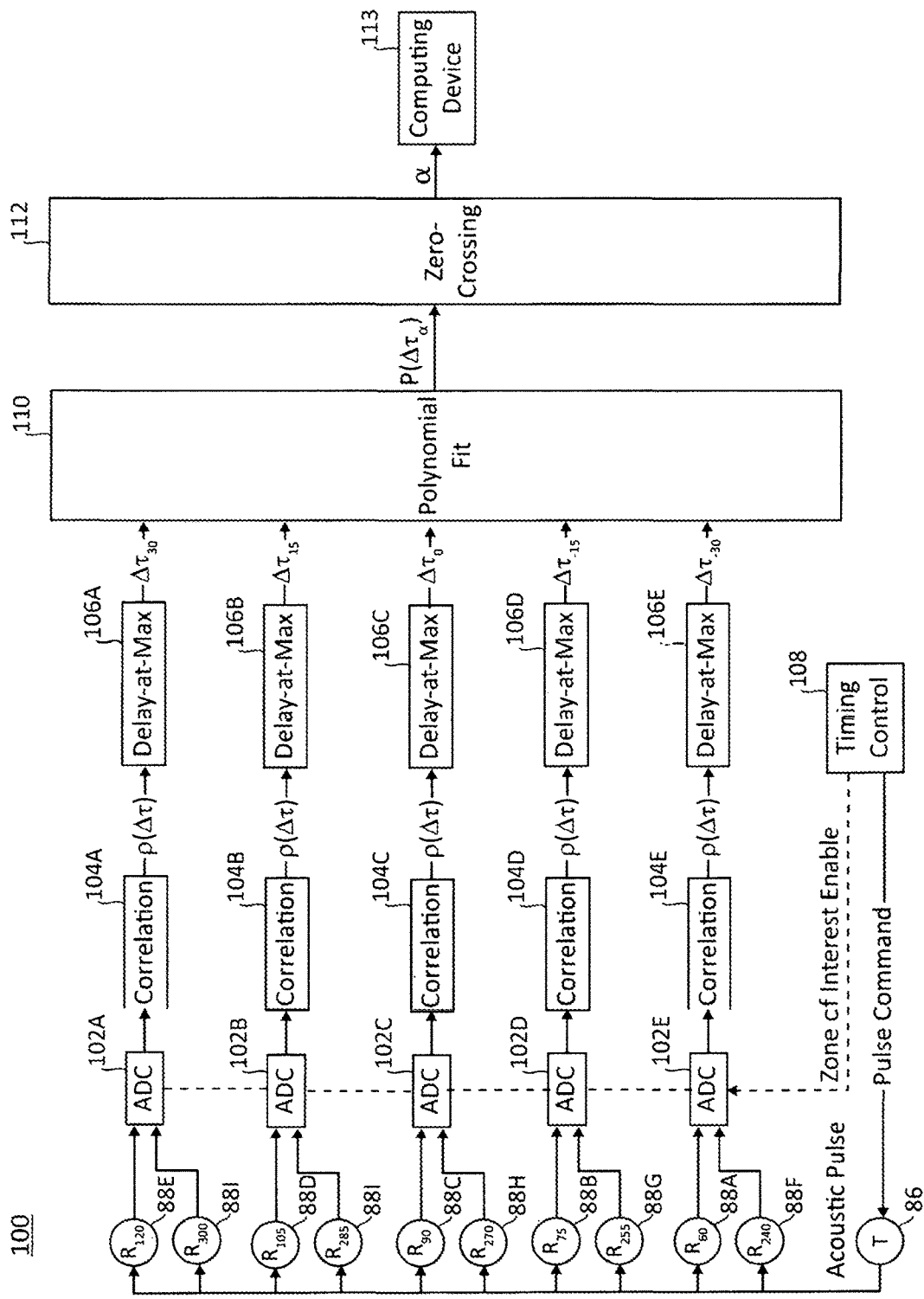
FIG. 8 is a system and software block diagram for a second example of an acoustic air data sensor, in accordance with one or more embodiments of the disclosure.

FIG. 8 is system diagram 100 including acoustic transmitter 86, acoustic receivers 88A-88J, analog-to-digital converters 102A-102E, cross-correlation circuitry 104A-104E, max delay circuitry 106A-106E, timing control circuitry 108, polynomial fit circuitry 110, zero-crossing circuitry 112, and computing device 113. For purposes of clarity and ease of discussion, system diagram 100 is discussed within the context of acoustic air data sensor 84 of FIG. 7.

Timing control circuitry 108 is configured to provide a pulse command to acoustic transmitter 86. Acoustic transmitter 86 can be configured to emit an acoustic pulse in response to receiving the pulse command. Acoustic receivers 88A-88E can receive the acoustic pulse after a time delay that is impacted by airspeed 92 as indicated by Equation 1. Acoustic receivers 88A-88E provide receiver signals to analog-to-digital converters 102A-102E. Analog-to-digital converters 102A-102E can convert the receiver signals to digital waveforms. Analog-to-digital converters 102A-102E can provide the digital waveforms to cross-correlation circuitry 104A-104E. Cross-correlation circuitry 104A-104E receives the digital waveforms. Cross-correlation circuitry 104A-104E determines correlation signals (ρ) using the digital waveforms. The correlation signal represents a cross-correlation function of the signals provided by the acoustic receivers. Cross-correlation functions indicate how alike two signals are based upon shifting one of the signals a given amount in time. Cross-correlation circuitry 104A-104E provides the correlation signals to max delay circuitry 106A-106D. Max delay circuitry 106A-106D receives the cross-correlation signals. Max delay circuitry 106A-106D determines the peak correlations of the correlation signals. The peak correlations correspond to the delay differences (τθ) of acoustic receivers 88A-88J. Max delay circuitry 106A-106D provides the delay differences to polynomial fit circuitry 110.

Polynomial fit circuitry 110 receives the time-of-flight differences from max delay circuitry 106A-106D. Each time-of-flight difference represents two points, one on either side of zero, because the difference is associated with two acoustic receivers 180° apart. In one example, polynomial fit circuitry 110 determines the best least-squares polynomial fit about the two points. In another example, polynomial fit circuitry 48 determines the polynomial based upon known curves. Acoustic receivers 88A-88E are positioned at known angles (Rθ) and known radius 90. Since the variables, except for angle-of-attack and airspeed, for determining the delays and therefore the delay differences are known, the delay difference curves are well established. Polynomial fit circuitry 110 provides the polynomial (PΔτθ). Zero-crossing circuitry 112 receives the polynomial from polynomial fit circuitry 110. Zero-crossing circuitry 112 determines the angle (α) where the polynomial crosses zero. Zero-crossing circuitry 112 provides the angle where the polynomial crosses zero to computing device 113. Computing device can be an aircraft controller, engine controller, or other computing device. Analog-to-digital converters 102A-102E, cross-correlation circuitry 104A-104E, max delay circuitry 106A-106E, timing control circuitry 108, polynomial fit circuitry 110, zero-crossing circuitry 112, and computing device 113 as described herein, can be implemented in hardware and/or software such as a processor executing instructions of computer-readable memory.

Figure 9:
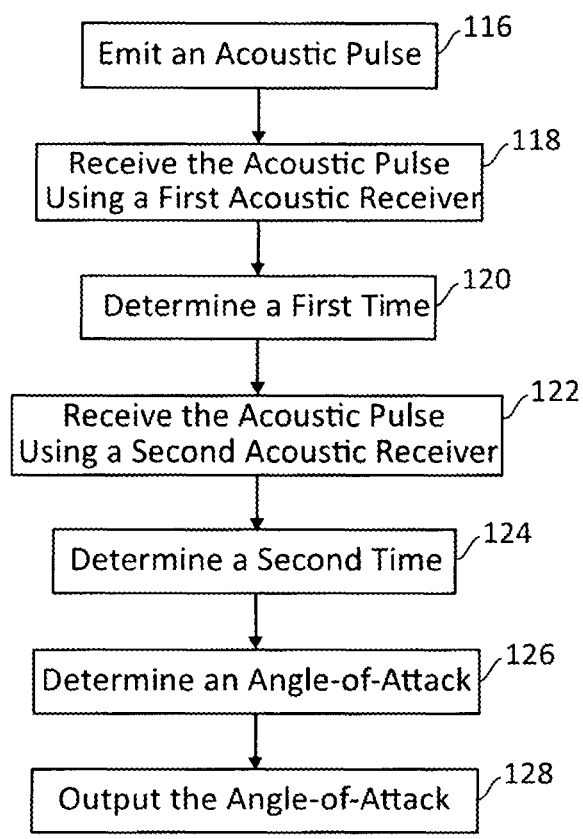
FIG. 9 is a flow chart of an acoustic angle-of-attack process, in accordance with one or more embodiments of the disclosure.

FIG. 9 is a flow chart of an embodiment of an acoustic wind angle sensing process 114. For purposes of clarity and ease of discussion, wind angle sensing process 114 is discussed in the context of system diagram 100 of FIG. 8. At step 116, an acoustic pulse can be emitted by acoustic transmitter 86. In one example, the acoustic pulse is emitted by acoustic transmitter 86 in response to receiving a pulse command from time control circuitry 108. At step 118, the acoustic pulse can be received by acoustic receiver 88A. At step 120, acoustic receiver 88A can provide a receiver signal in response to receiving the acoustic pulse. At step, 122, acoustic receiver 88F can receive the acoustic pulse. At step 124, acoustic receiver 88F can provides receiver signal in response to receiving the acoustic pulse. At step 126, a delay difference between the first and second receiver signals can be determined. In some examples, the delay difference can be determined using delay circuitry 44A and difference circuitry 46A of FIG. 4. In other examples, the delay difference can be determined using cross-correlation circuitry 104E and max delay circuitry 106E. At step 128, a wind angle (e.g., AOA) is determined based upon the delay difference. In some examples, the delay difference can be used to determine a polynomial using polynomial fit circuitry 110. Zero-crossing circuitry 112 can determine the angle that the polynomial equals zero to determine the wind angle. At step 130, the wind angle can be provided to computing device 113. In certain embodiments, the computing device 113 can be an aircraft computer or any other suitable device. It should be understood that more than two acoustic receivers may be used to determine wind angle. In instance, a third acoustic receiver may receive the acoustic pulse and provide a receiver signal in response to the acoustic pulse.

Accordingly, implementing certain techniques of this disclosure, acoustic air data sensors can be used accurately determine wind angle without obstructing airflow or using mechanical moving parts. Using acoustic air data sensors as described herein, provides a high bandwidth and update rate measurement of angle-of-attack without placing sensor components directly into airflow. This lowers the icing risks of the angle-of-attack sensor and reduces airflow disturbance and drag.

Figure 10:
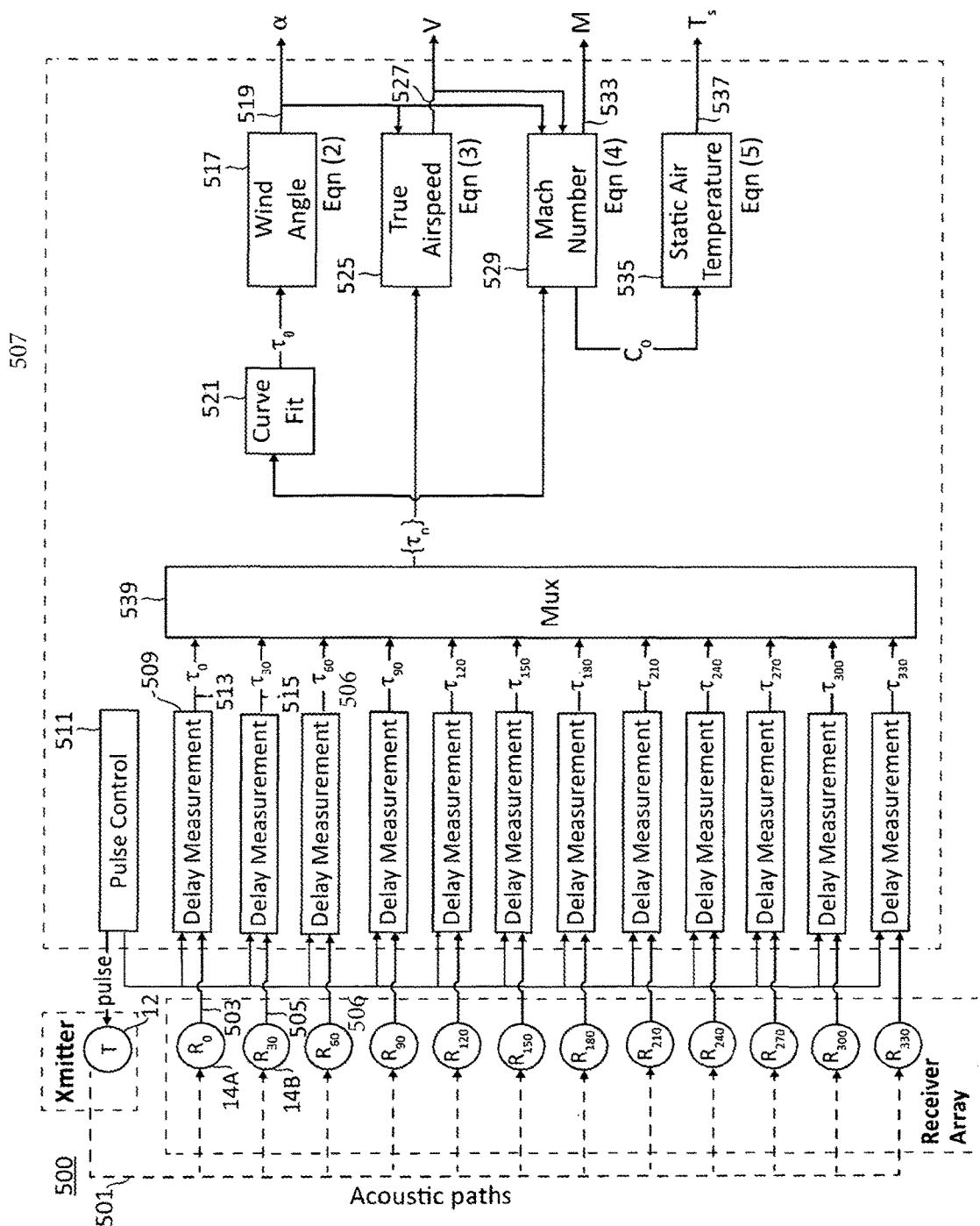
FIG. 10 is a schematic diagram of an embodiment of a sensor or sensor system in accordance with this disclosure, in accordance with one or more embodiments of the disclosure.

In accordance with at least one aspect of this disclosure, it is contemplated that one or more embodiments of an air data sensor system 500 may be used to determine airspeed and/or other air data parameters. For example, referring to FIG. 10, the acoustic airspeed sensor system 500 may include at least one acoustic transmitter 12 (T) configured to provide an acoustic pulse and a plurality of acoustic receivers, e.g., 14A-14K as shown in FIG. 1. The one or more receivers can include at least a first acoustic receiver (e.g., 14A) positioned at a first radial distance (e.g., downstream in operation) from the at least one acoustic transmitter 12 and a second acoustic receiver (e.g., 14B) positioned at a second radial distance (e.g., downstream in operation) from the at least one acoustic transmitter 12.

The first acoustic receiver can be configured to receive the acoustic pulse 501 at a first time and output a first receiver signal 503. The second acoustic receiver is configured to receive the acoustic pulse 501 at a second time and output a second receiver signal 505. The third acoustic receiver is configured to receive the acoustic pulse 501 at a third time and output a third receiver signal 506. The sensor system 500 can include a computation unit 507 operatively connected to the first acoustic receiver, the second acoustic receiver and the third acoustic receiver. The computation unit 507 includes one or more processors and a memory communicatively coupled to the one or more processors. The memory stores instructions for the one or more processors, which instruct the one or more processors to perform tasks described herein. The computation unit 507 may perform all computations tasks within a centralized componentry (e.g., an integrated circuit), or within a set of modules, each module including the electronic circuitry required to perform specific computational tasks.

The computation unit 507 is configured to receive the first receiver signal 503, the second receiver signal 505 and the third receiver signal 506, determine a first propagation time between receiving the first receiver signal and transmission of the acoustic pulse 501 by the acoustic transmitter 12, determine a second propagation time between receiving the second receiver signal and transmission of the acoustic pulse 501 by the acoustic transmitter 12, and determine a third propagation time between receiving the third receiver signal and transmission of the acoustic pulse 501 by the acoustic transmitter 12. The computation unit 507 is configured to determine the propagation time of the first propagation time, the second propagation time, and the third signal via any known method or a combination of known methods. For example, the computation unit 507 may be configured to determine the propagation time based on a change in signal amplitude. In another example, the computation unit 507 may be configured to determine the propagation time based on a change in signal phase. In another example, the computation unit may be configured to determine the propagation time bases on the difference between the time a signal was transmitted and received.

The computation unit 507 can be configured to receive or determine a wind angle. For example, the computation unit 507 can include any suitable circuitry as described above to determine wind angle (e.g., AOA). The computation unit 507 can be configured to determine airspeed (e.g., a true airspeed (TAS), an equivalent airspeed (EAS), or a calibrated airspeed (CAS) based upon the first propagation time, the second propagation time, and the wind angle, and output an airspeed signal indicative of the airspeed.

In certain embodiments, the computation unit 507 can include one or more propagation measurement modules 509 (e.g., which can be similar to delay circuitry as described above) operatively connected to a pulse control module 511 and the first, second and/or third acoustic receiver. As shown, each receiver can include a dedicated delay measurement module 509. Any other suitable number of propagation measurement modules 509 are contemplated herein. The pulse control module 511 can be operatively connected to the transmitter 12 and configured to cause the transmitter 12 to send the acoustic pulse 501 at a send time. The one or more propagation measurement modules 509 can be configured to compare the send time and the first time to determine the first propagation time and output first propagation data 513 indicative thereof. The one or more propagation measurement modules 509 can be configured to compare the send time to the second time to determine the second propagation time and output second propagation data 515. The one or more propagation measurement modules 509 can be configured to compare the send time to the third time to determine the third propagation time and output third propagation data 516.

The computation unit 507 can include a wind angle module 517 operatively connected to the one or more propagation measurement modules 509 to receive the first propagation data 513, second propagation data 515, and the third propagation data 516. The wind angle module 517 can be configured to determine the wind angle based on the first propagation data 513, the second propagation data 515, and the third propagation data 516 and to output wind angle data 519 (e.g., to an aircraft computer and/or other module). The computation unit 507 can include a curve fit module 521 configured to curve fit the first propagation data 513, the second propagation data 515, and the third propagation data and to output curve fit data 523 to the wind angle module 517.

The computation unit 507 can include an airspeed module 525 operatively connected to the wind angle module 517 to receive wind angle data 519 therefrom. The airspeed module 525 can be operatively connected to the one or more propagation measurement modules 509 to receive the first propagation data 513, the second propagation data 515, and the third propagation data 516. The airspeed module 525 can be configured to determine airspeed based on the wind angle data 519, the first propagation data 513, the second propagation data 515, and the third propagation data 516, and to output the airspeed signal 527 (e.g., to an aircraft computer and/or other module).

The computation unit 507 can include a speed of sound module 529 operatively connected to the airspeed module 525 to receive the airspeed signal 527. The speed of sound module 529 can be operatively connected to the one or more propagation measurement modules 509 to receive the first propagation data 513, the second propagation data 515, and the third propagation data 516. The speed of sound module 529 can be operatively connected to the one or more propagation measurement modules 509 to receive the first propagation data 513, the second propagation data 515, and the third propagation data 516. The speed of sound module 529 can be operatively connected to the wind angle module 517 to receive wind angle data 519. The speed of sound module 517 can be configured to determine a speed of sound based on the airspeed signal 527, the first propagation data 513, the second propagation data 515, and the third propagation data 516, and to output speed of sound data 531 (e.g., to an aircraft computer and/or other module).

The speed of sound module 529 can be configured to determine a Mach number from the speed of sound and to output a Mach number signal 533 (e.g., to an aircraft computer and/or other module). The computation unit 507 can include a static air temperature module 535 operatively connected to the speed of sound module 529 to receive the speed of sound data 531 to determine a static air temperature based on the speed of sound data 531, and to output a static air temperature signal 537 (e.g., to an aircraft computer and/or other module).

In certain embodiments, the computation unit 507 can include a multiplexer 539 (e.g., "MUX" in FIG. 10) between the one or more propagation measurement modules 509 and at least one other module of the computation unit 507. The multiplexer 539 can be configured to receive the first propagation data 513 and the second propagation data 515 from the one or more propagation measurement modules and to multiplex the data (e.g., for output to consuming modules, e.g., the wind angle module, the airspeed module, and the speed of sound module).

In certain embodiments, the computational unit is configured to construct a propagation function for calculating true airspeed. The propagation function may be constructed via the input of several types of data. For example, the propagation function may include data relating to the location of the acoustic transmitter relative to the first acoustic receiver, the second acoustic receiver and/or the third acoustic receiver. In another example, the propagation function may further include data relating to the amplitude of the first receiver signal/pulse, the second receiver signal/pulse, or the third receiver signal/pulse relative to the amplitude of a test signal/pulse. In another example, the propagation function may further include data relating to the phase shift of the first receiver signal/pulse, the second receiver signal/pulse, or the third receiver signal/pulse relative to a test signal/pulse. The propagation function may also include data relating to wind angle (e.g., angle of attack) and/or the speed of sound.

In certain embodiments, the computation unit 507 may use a beamforming algorithm in generating the propagation function. Beamforming is a data processing technique that has been utilized extensively in the radar and acoustic fields. Traditionally, beamforming algorithms use an assumed propagation function and a known receiver location to determine the location of an unknown source (e.g., a transmitter). These same beamforming algorithms may also be rearranged such that a propagation function may be determined if both the receiver location and the transmitter location are known and the receiver signal/pulse has been characterized (e.g., by determining the phase and/or amplitude of the receiver signal/pulse, as well as angle of attack and speed of sound).

Figure 11:
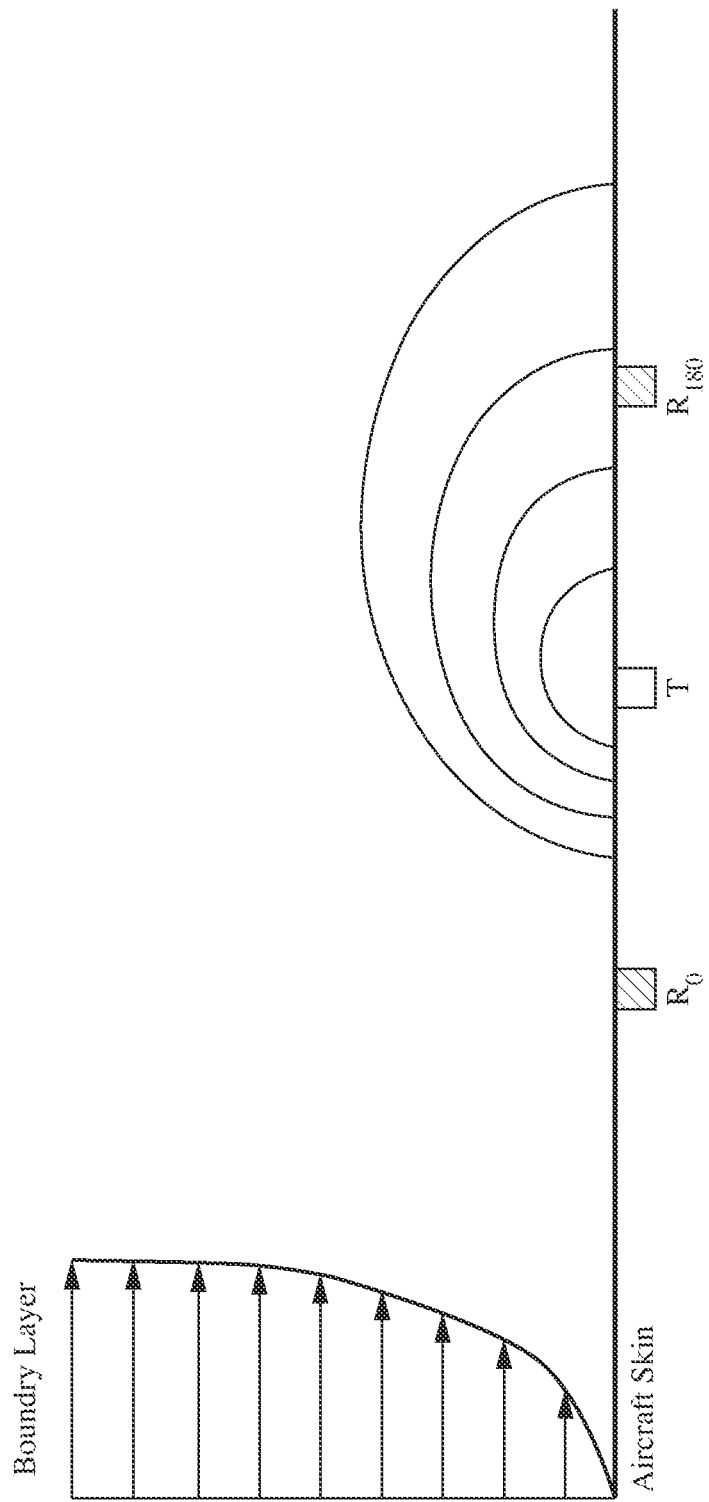
FIG. 11 is a view of an acoustic air data sensor with unrestricted airflow with an indication of the boundary layer, in accordance with one or more embodiments of the disclosure.

Beamforming algorithms are particularly well-suited to take into account the effects of the boundary layer on airspeed measurements in anemometers that are flush or near-flush with the surface of an aircraft. The boundary layer is the air layer close to the surface or skin of the aircraft in flight that varies from zero velocity to free stream velocity, as shown in FIG. 11. This gradient of air velocities within the boundary layer makes accurate determinations of true airspeed by flush or near flush instruments difficult using traditional calculations methods, necessitating the use of other calculation methods, such as the use of beamforming algorithms.

The beamforming algorithm used in generating the propagation function may include any beamforming algorithm known including but not limited to classical beamforming algorithms, Capon algorithms, MUSIC algorithms, root-MUSIC algorithms, Bartlett algorithms, ESPIRIT algorithms, Min-Norm algorithms, Burg algorithms, SAMV algorithms, Welch algorithms, Time-Reversal MUSIC algorithms, MVDR algorithms, Akaike Information Criteria algorithms, and Minimum Descriptive Length (MDL) Criteria algorithms. The beamforming algorithms may also include newly described beamforming algorithms.

Generally, a beamforming algorithm for determining the propagation function may include equations where the signal at each microphone is a function of the convolutional integral of the number of discrete sources multiplied by the propagation function (e.g., Green's function) between each source: $\mu_n(t) = \iiint C_n(x_s) \cdot S(x_s, t) d^3 x_s$. Here, t is the propagation time, $x_s$ describes the vector coordinates of each transmitter, $\mu_n(t)$ is the propagation response of each receiver at $x_n$ (e.g., $x_n$ defined as the vector coordinates of each receiver), $Cn(x_s)$ is the propagation function (e.g., Green's function) between the receiver (n) and the transmitter at $x_s$. For linear propagation with no flow, the propagation function may be defined as:

$$C_n(x_s) = e^{-\omega\sigma(x_n, n_s)} / (D(x_n, x_s)) \qquad \text{(Equation 1)}$$

where $\sigma(x_n, x_s)$ is the propagation time between the receiver at $x_n$ and the transmitter at $x_s$ (e.g., usually a function of the speed of sound and distance between transmitter/receiver), $D(x_n, x_s)$ is the magnitude factor between the receiver at $x_n$ and the transmitter at $x_s$ (e.g., usually a function source directivity and distance between transmitter/receiver, and w is the wind angle (e.g., angle of attack).

In certain embodiments, the beamforming-based equations used for determining the propagation function and/or true windspeed assume that only a single transmitter is used with multiple receivers, and that the timing of the acoustic pulse is known. The beamforming-based equations also assume that the propagation function without air flow is known via measurement and that the propagation function while flying is a function of air speed, wind angle (e.g., angle of attack), and the local speed of sound outside of the boundary layer. There is also an assumption that signal to noise is adequate such as both propagation time and magnitude may be measured.

In certain embodiments, the acoustic airspeed sensor system 500 includes a phase/amplitude module communicatively coupled to and/or included within the computation unit 507 configured to determine the phase of the acoustic wave and/or determine the difference in phase between the acoustic pulse and a test pulse (e.g., a pulse that is measured under a wind-free condition) received at the first acoustic receiver, the second acoustic receiver, or the third acoustic receiver. The phase shift module includes an oscilloscope configured to measure the phase of the acoustic pulse at the at the first acoustic receiver, the second acoustic receiver, and/or the third acoustic receiver. Circuitry within the phase shift module and/or the computation unit 507 may be configured to calculate the differences between the phase of a received test pulse and the received acoustic pulses from the first acoustic receiver, the second acoustic receiver, and the third acoustic receiver. Once a phase shift has been determined, the difference in propagation time (Δt) between the test pulse and the acoustic pulse may be calculated. Oscilloscope methods for determining phase shift for wind speed has been performed for several decades and is extensively described in the manuscript "The Measurement of Wind Velocity by Sonic Means" by R. M. Schotland (Vol. 12 pg. 386-390 which is incorporated in its entirety. The phase/amplitude module may also be configured to measure the amplitude of received acoustic pulses via the oscilloscope and determine a difference between the amplitude of the received acoustic pulses and the test pulse. The calculated differences in amplitude between the pulses may then be used in the determination of wind speed or other characteristic.

As described above, in certain embodiments, at least two of first radial distance, the second radial distance, and the third radial distance of the receivers 14A-14K can be the same. However, it is contemplated that varying radial distance may be used for determining certain air data parameters (e.g., airspeed). For example, the first receiver (e.g., 14A), the second receiver (e.g., 14B), and/or any other additional receivers (e.g., 14C-14K) can be disposed in a circle pattern around the transmitter 12.

In certain embodiments, the pattern need not be circular. For example, the radial distance from transmitter to all receivers need not be a fixed distance. Each receiver can be placed at a different, known radial distance. Then all the transit delays measured can be normalized to an arbitrary fixed reference distance. As a non-limiting example, if a first receiver is at 1 cm and a second receiver is at 4 cm then both can be normalized to a fixed reference distance of, e.g., 2 cm. In this example, the first receiver's measured delay would be doubled (delay=2 cm/1 cm) and the second receiver's measured delay would be halved (delay=2 cm/4 cm). Such new delay numbers are effectively what would have been measured if the receivers were all positioned at 2 cm. This is one way to allow for non-circular patterns for the receivers. The receiver still spans multiple angles. Any other suitable embodiment to allow for non-circular receivers is contemplated herein.

In certain embodiments, one or more of the receivers (e.g., 14A-14K) may include microelectro-mechanical systems (MEMS) microphones. Any other suitable type of acoustic receiver is contemplated herein.

Figure 12:
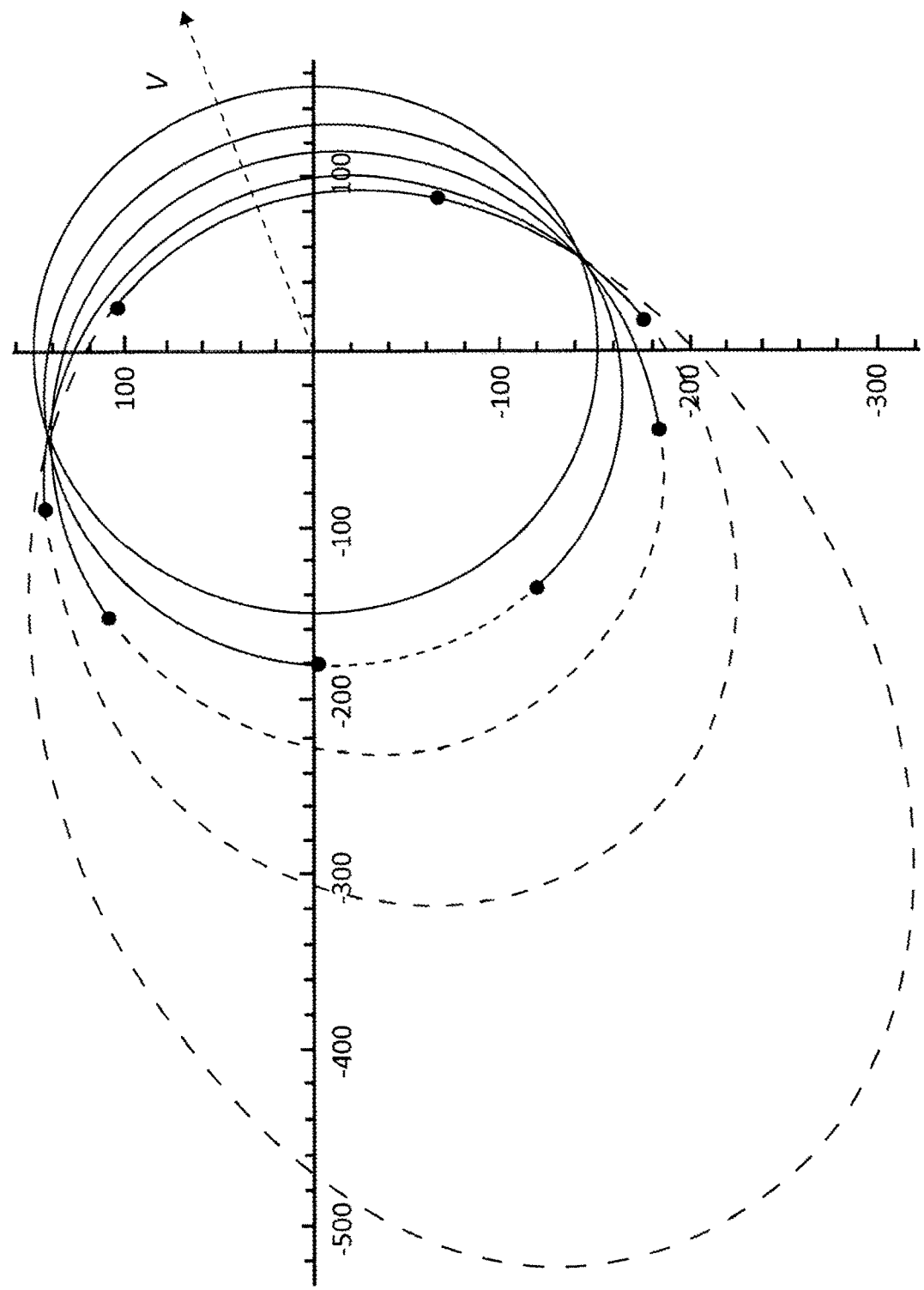
FIG. 12 is a polar plot depicting the time-of-flight between an acoustic transmitter and an acoustic receiver at various air speeds (V=0, 60, 120, 180, and 240 as shown), showing the shadowing effect due to velocity, in accordance with one or more embodiments of the disclosure.

Referring additionally to FIG. 12, certain receivers may be shadowed under certain operating conditions (e.g., as a function of wind angles and airspeed). Dotted line regions show, with respect to the above described polar chart, where receivers of certain positions will be shadowed as a result of wind angle and airspeed. In selecting the number of receivers and positions thereof, it is contemplated that embodiments where only receivers that are not shadowed under all operating conditions can be used in a sensor, instead of a full circle of receivers (e.g., as shown in the embodiment of FIG. 7).

In certain embodiments, the computation unit 507 can be configured to determine if an acoustic receiver is shadowed, e.g., by setting a maximum time for response. The computation unit 507 can ignore any signals from the shadowed acoustic receivers so that false data or noise is not considered in determining air data parameters (e.g., wind angle and airspeed).

Figure 13:
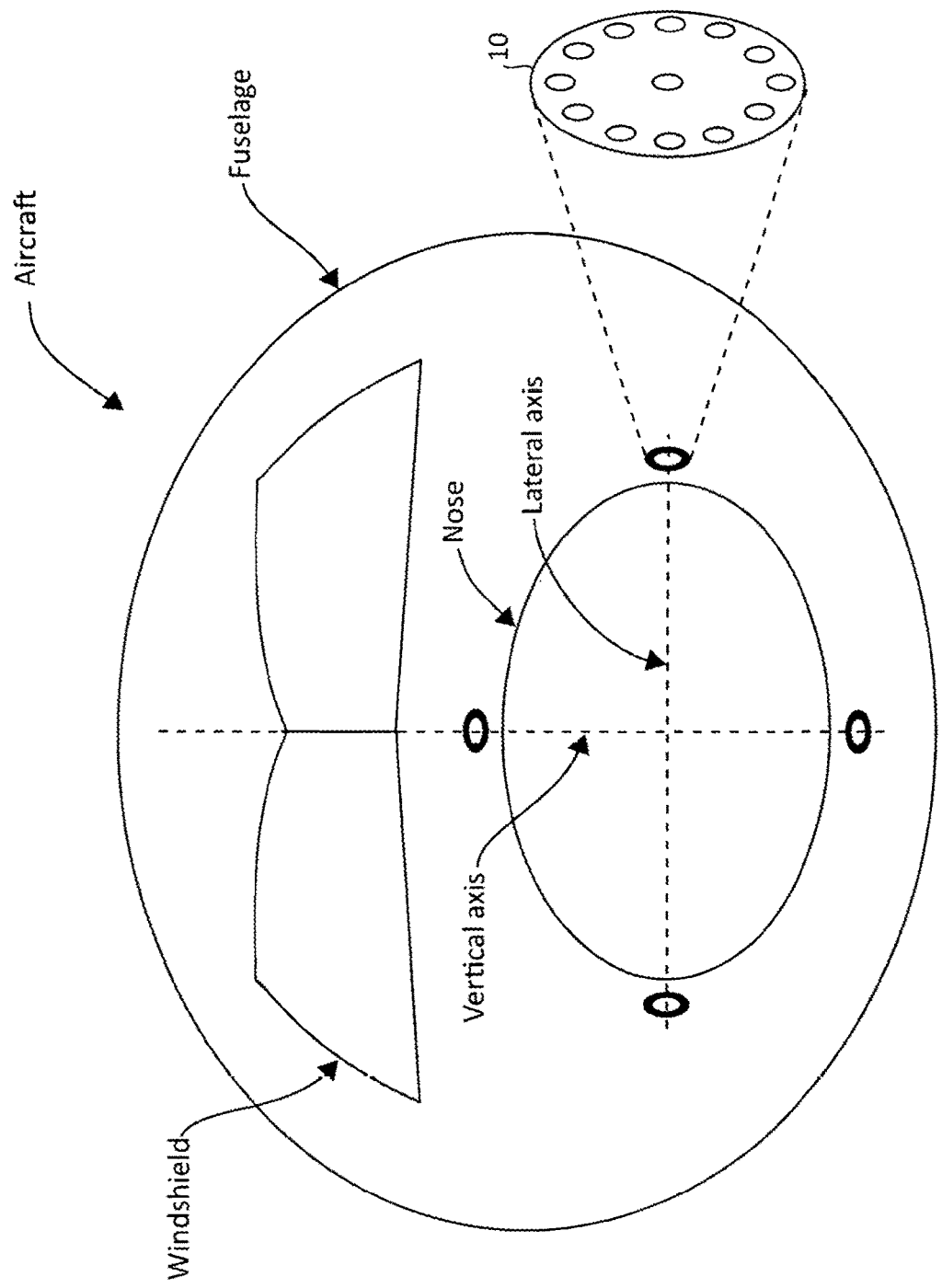
FIG. 13 is a schematic diagram of an embodiment of placement of one or more sensors on an aircraft, in accordance with one or more embodiments of the disclosure.

Referring additionally to FIG. 13, an embodiment of placement of one or more sensors is shown. As shown, in certain embodiments, the one or more sensors can be placed on a side of an aircraft (e.g., where pitot static tubes are, mounted so airflow stays attached to the fuselage and/or where flow over will not be blocked). As shown, multiple sensor locations can be utilized to determine both angle of attack and angle of slideslip.

In embodiments of the system disclosed herein, the transmitter is upstream of all receivers used to determine, e.g., airspeed. This is not the case with traditionally acoustic sensors and allows operation in airspeeds above about Mach 0.2.

A computer implemented method can include emitting an acoustic pulse using at least one acoustic transmitter; receiving, at a first time, the acoustic pulse using a first acoustic receiver positioned at a radial distance from the at least one acoustic transmitter; providing a first receiver signal from the first acoustic receiver in response to receiving the acoustic pulse, receiving, at a second time, the acoustic pulse using a second acoustic receiver positioned at the radial distance from the at least one acoustic transmitter, and providing a second receiver signal from the second acoustic receiver in response to receiving the acoustic pulse. The computer implemented method may further include receiving, at a third time, the acoustic pulse using a third acoustic receiver positioned at a radial distance from the at least one acoustic transmitter, and providing a third receiver signal from the third acoustic receiver in response to receiving the acoustic pulse.

The method can include determining a first propagation time between the first acoustic receiver and the acoustic transmitter, determining a second propagation time between the second acoustic receiver and the acoustic transmitter, determining a third propagation time between the third acoustic receiver and the acoustic transmitter.

The method can include constructing a propagation function based on at least one of: the location of the at least one acoustic transmitter relative to at least one of the first receiver, the second receiver, or the third receiver; the amplitude of the at least one of the first receiver signal, the second receiver signal, or the third receiver signal; or the phase of the at least one of the first receiver signal, the second receiver signal, or the third receiver signal.

The method can include determining an airspeed based upon the first propagation time, the second propagation time, the third propagation time and a wind angle, and outputting an airspeed signal to an aircraft system.

The method can include receiving a wind angle, or determining the wind angle based on the first propagation time, the second propagation time or the third propagation time. The method can include determining a speed of sound based on the wing angle, the airspeed, the first propagation time, the second propagation time, or the third propagation time.

The method can include determining a Mach number based on the speed of sound and outputting the Mach number to an aircraft system. The method can include determining a static air temperature based on the speed of sound and outputting the static air temperature to an aircraft system.

Disclosed is an ultrasonic acoustic system that directly measures air-craft airspeed and relative wind angle (e.g., angle of attack or sideslip). This design has no pitot probe or moving mechanical parts such as is typical for traditional pressure-based air data systems and wind vane sensor designs. By measuring the acoustic time-of-flight/phase modulation and signal strength of an acoustic pulse at a span of angles and distances across a flush surface, this information can be used to construct aircraft airspeed and wind angle.

By placing a ring of ultrasonic receivers (microphones) at a fixed radius r around a transmitter as shown in FIG. 1 the time-of-flight of an acoustic pulse can be measured to each receiver. The time-of-flight T of an acoustic pulse from the transmitter T to a receiver Rθ placed at angle θ is given by: $\tau_\theta = r/(C_0 + V\cos(\alpha-\theta))$ (e.g., $V \geq 0$, and $C_0 \geq 0$), where $C_0$ is the speed of sound, V is the air speed, a is the relative wind angle, and r is the radius of separation. This is a delay equation that defines the basic relationship between these air-data parameters and actual acoustic pulse time-of-arrival delays between a transmitter and multiple receivers. In certain embodiments, as shown in FIG. 1, the geometry of the receivers Rθ can be a circular pattern at fixed angles θ at a radius of r from a transmitter T. Embodiments of finding one or more air data parameters can include an incremental approach, first receiving or determining wind angle (e.g., angle of attack), then using wind angle to determine for true airspeed (e.g., true airspeed), then optionally using wind angle and true airspeed to determine for speed of sound, and then optionally using speed of sound to determine for static air temperature.

An embodiment for determining wind angle is disclosed above. An additional embodiment of a process for determining wind angle is described below.

Even if the true angle of attack or other wind angle does not align with any receiver, we can interpolate to estimate this angle. Since the delay equation is minimum at angle-of-attack, (i.e., $\alpha = \text{argmin}[\tau\theta]$, θ), and it is symmetrical about a (i.e.: $\tau_{\alpha}+\Delta\theta = \tau_{\alpha}-\Delta\theta$), this suggests fitting the receiver delays bracketing the minimum with a parabola. Since each receiver delay measurement will be corrupted by measurement noise and the minimum may occur between two receivers, it is best to curve fit a function to receiver delays and extract the minimum from the fitted function. Fit this to the second order equation: $\tau(\theta) = a\theta^2 + b\theta + c$, which has minimum at $\theta = -(b/2a)$. Denote the minimum measured delay and its receiver angle as the point $(\theta_0, \tau_0)$, then denote the points on either angular side of this as $(\theta_-, \tau_-)$ and $(\theta_+, \tau_+)$ This yields an angle of attack estimation formula: $\hat{\alpha} = \theta_0 - ((\theta_+ - \theta_-)/4)((\tau_+ - \tau_-)/(t_+ - 2t_0 + t_-))$ An embodiment of a process for determining true airspeed TAS is described below. For any two distinct receiver delays $\tau\theta_n$ and $\tau\theta_m$, their reciprocal difference is: $(1/\tau\theta_n) - (1/\tau\theta_m) = (V/r)\{\cos(\alpha-\theta_n) - \cos(\alpha-\theta_m)\}$, and solving for true airspeed estimate: $\hat{V} = r(((1/\tau\theta_n) - (1/\tau\theta_m))/(\cos(\alpha-\theta_n) - \cos(\alpha-\theta_m)))$.

An embodiment of a process for determining a speed of sound SOS is described below. For any two distinct receiver delays $\tau\theta_n$ and $\tau\theta_m$, their reciprocal sum is $(1/\tau\theta_n) - (1/\tau\theta_m) = 2(C_0/r) + (V/r)\{\cos(\alpha-\theta_n) + \cos(\alpha-\theta_m)\}$, and solving for the speed of sound estimate: $\hat{C}_0 = (r/2)(1/\tau\theta_n) + (1/\tau\theta_m) - V/2\{\cos(\alpha-\theta_n) + \cos(\alpha-\theta_m)\}$.

For numerical reasons, ideally one would pick a pair of receivers on opposite sides of the receiver circle, both at right angles to the angle of attack. Since not all receivers will yield delay measurement due to shadowing effects, the next best is picking a pair as close to 180 degrees apart as possible and as close to 90 degrees away from a as possible. Mach number can be determined using the true airspeed and the speed of sound as appreciated by those having ordinary skill in the art.

An embodiment of a process for determining a static air temperature (SAT) Using the speed of sound in knots, the static air temperature in Celsius is then estimated as:

$\hat{T}_s = (C_0/\kappa)^2 - 273.15$, where $\kappa = 38.96695$ knots/K° $^{-(0.5)}$ or equivalently for speed of sound in meters/sec to degrees Celsius: $\hat{T}_s = (C_0/\kappa)^2 - 273.15$, where K=(meters/sec)/K° $^{-(0.5)}$.

Signal loss between the transmitter and any receiver is driven by geometrical scattering, molecular absorption, and turbulent scattering. The first two effects are omni-directional so effect all receivers equally. Geometrical scattering is caused by the sound energy spreading out as it propagates ways from its source. Molecular absorption is caused by sound energy being converted to heat as the sound wave propagates through the air.

Turbulent scattering, caused by local gradients in wind velocity and temperature that induces fluctuations in phase and amplitude of the sound waves as they propagate through the air, is directional. Since the transmitter and receivers are flush mounted the velocity boundary layer effect will bend the sound waves traveling upstream away for the mount surface and sound waves traveling downstream into the mount surface. This bending causes an increase in signal strength in downstream receivers and a loss, or shadowing of signal strength in upstream receivers. The sound propagating at right angles to the airflow are not bent. Only at low airspeeds will all receivers have sufficient signal strength to separate the acoustic pulses from background noise. At higher airspeeds the upstream receivers will be "shadowed" due to signal loss through the air. This shadowing effect becomes more significant at higher airspeeds as shown in FIG. 12. The faster the velocity, the less receivers away from the velocity vector will receive a signal and are thus effectively shadowed. The shadowed portion of the arc can be referred to as the "wedge angle," and there may be no need for sensors that are always shadowed. (e.g., outside of about 90 degrees of wedge angle for normal operations in commercial aircraft).

Likewise, temperature gradient effect will shadow receivers if the mount is warmer than the surrounding air and reinforce signals if the mount is cooler than surrounding air. The thermal gradient shadowing is a transient effect as the mount temperature will cool due to large volume of airflow. As a consequence of this shadowing effect, all airspeed information needs to be extracted from delay data gathered from the non-shadowed receivers.

This is in direct contradiction to the way typical acoustic wind measurements are made, using pairs of receivers 180 apart from each other. As described above, delay measurement logic can include a threshold time at which it is assumed that the receiver is not ever going to receive a signal, then determine that the receiver is "shadowed" and input null entry.

As described herein, a pulse command from the pulse control timing logic of the pulse control module 511 can be converted into an acoustic pulse by the transmitter 12. The pulse control module 511 can create a shaped waveform designed to be robust to the ambient noise so that the propagation measurement modules 509 can extract pulse timing information in the presence of noise corruption. Pulse control module 509 can also time stamp the pulse transmit time so that the pulse arrival times can be determined by the modules 509. The propagation measurement modules 509 can extract the delay between the transmitter pulse command and received waveforms and outputs the time delay between them as T. For clarity FIG. 5 shows the relative timing of the transmitted and received signals. For illustrative purposes the depicted pulse shape is a sinusoidal wave-train, but could be a simple Gaussian pulse or more complicated pattern depending on the difficulty of extracting the received pulse from the background noise.

As described above, each delay measurement module can include an analog-to-digital converter sampling at a sufficient rate to determine the delay time with sufficient resolution for accurate airspeed measurements (e.g., in fractions of a microsecond). A multiplexer 539 can gather measured delay times/data into an indexable list. The shadowed receiver delays can be included in the list as null entries so that subsequent blocks can dynamically adapt to the varying length and distribution of non-shadowed entries.

Curve fit module 521 can accept the set of delay differences as shown which are points along the one of the curves. The curve fit module 521 can determine the best least-squares fit to the non-null list entries, and the resulting output parameters can define a curve equation denoted as $\tau\theta$.

The wind angle module 517 can use the curve fit function $\tau\theta$ and solve for the angle $\alpha$ where the function is minimized as described above. This minimizing angle can be output as the wind angle $\alpha$. The airspeed module 525 uses the wind angle estimate from wind angle module 517 and the measured delay list $\tau_n$ to compute the true airspeed V as described above.

The speed of sound module 529 can use the estimated wind angle and true airspeed to compute the estimated speed of sound $C_0$ as described above. The estimated true airspeed is divided by $C_0$ to compute the Mach number M. The static air temperature module 535 can compute the static temperature (Ts) as described above.

Using an ultrasonic angle-of-attack sensor design, which captures acoustic pulse time-of-flight at multiple angles with respect to the aircrafts airflow, provides the following benefits: a single unit capable of measuring true airspeed and wind angle (e.g., angle-of-attack or angle of sideslip), a direct measurement of the speed of sound to compute current, Mach number and static air temperature, unobstructed airflow across the sensor, eliminating airflow disturbance and drag, no mechanical moving parts, which results in higher bandwidth and update rate for wind angle, lower de-icing requirements as no sensor component faces directly into the airflow, and true positive failure detection when receivers cannot extract pulse signals (due to a multitude of reasons, including icing) in contrast to pitot-static ports icing to fixed reasonable, but wrong, pressures.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An acoustic airspeed sensor system, comprising: At least one acoustic transmitter configured to provide an acoustic pulse; a plurality of acoustic receivers, including at least: a first acoustic receiver positioned at a first radial distance from the at least one acoustic transmitter, the first acoustic receiver configured to: receive the acoustic pulse at a first time; and output a first receiver signal; a second acoustic receiver positioned at a second radial distance from the at least one acoustic transmitter, the second acoustic receiver configured to: receive the acoustic pulse at a second time; and output a second receiver signal; a third acoustic receiver positioned at a third radial distance from the at least one acoustic transmitter, the third acoustic receiver configured to: receive the acoustic pulse at a third time; and output a third receiver signal; and a computation unit operatively connected to the first acoustic receiver, the second acoustic receiver, and the third acoustic receive comprising: one or more processors; and a memory communicatively coupled to the one or more processors and having instructions stored thereon, which when executed by the one or more processors, causing the one or more processor to: receive the first receiver signal, the second receiver signal, and the third receiver signal; determine a first propagation time between receiving the first receiver signal and transmission of the acoustic pulse by the at least one acoustic transmitter; determine a second propagation time between receiving the second receiver signal and transmission of the acoustic pulse by the at least one acoustic transmitter; determine a third propagation time between receiving the third receiver signal and transmission of the acoustic pulse by the at least one acoustic transmitter; construct a propagation function based on at least: a location of the at least one acoustic transmitter relative to at least one of the first acoustic receiver, the second acoustic receiver, and the third acoustic receiver; an amplitude of the at least one of the first receiver signal, the second receiver signal, or the third receiver signal; or a phase of the at least one of the first receiver signal, the second receiver signal, or the third receiver signal; receive or determine a wind angle; and determine an air speed based on the propagation function and at least one of the first propagation time, the second propagation time, the third propagation time, and the wind angle, and output an airspeed signal indicative of airspeed.

2. The acoustic airspeed sensor system of claim 1, wherein the computation unit includes one or more propagation measurement modules operatively connected to a pulse control module and at least one of the first acoustic receiver, the second acoustic receiver, or the third acoustic receiver, wherein the pulse control module is operatively connected to the at least one acoustic transmitter and configured to cause the at least one acoustic transmitter to send the acoustic pulse at a send time, wherein the one or more propagation measurement modules are configured to compare the send time and the first time to determine the first propagation time and output first propagation data, wherein the one or more propagation measurement modules are configured to compare the send time to the second time to determine the second propagation time and output second propagation data, wherein the one or more propagation measurement modules are configured to compare the send time to the third time to determine the third propagation time and output third propagation data.

3. The acoustic airspeed sensor system of claim 2, wherein the computation unit includes a wind angle module operatively connected to the one or more propagation measurement modules to receive the first propagation data, the second propagation data, and the third propagation data and configured to determine the wind angle based thereon, and to output wind angle data.

4. The acoustic airspeed sensor system of claim 3, wherein the computation unit includes an airspeed module operatively connected to the wind angle module to receive wind angle data therefrom, wherein the airspeed module is operatively connected to the one or more propagation measurement modules to receive the first propagation data, the second propagation data, and the third propagation data, wherein the airspeed module is configured to determine airspeed based on the wind angle, the first propagation data, the second propagation data, and the third propagation data, and to output an air speed signal.

5. The airspeed sensor system of claim 4, wherein the computation unit includes a speed of sound module operatively connected to the airspeed module to receive the airspeed signal, wherein the speed of sound module is operatively connected to the one or more propagation measurement modules to receive the first propagation data, the second propagation data, and the third propagation data, wherein the speed of sound module is operatively connected to the one or more propagation measurement modules to receive the first propagation data, the second propagation data, and the third propagation data, wherein the speed of sound module is operatively connected to the wind angle module to receive the wind angle data, wherein the speed of sound module is configured to determine a speed of sound based on the wind speed data, the first propagation data, the second propagation data, and the third propagation data, and to output speed of sound data.

6. The airspeed sensor system of claim 5, wherein the speed of sound module is configured to determine Mach number from the speed of sound and to output a Mach number signal.

7. The airspeed sensor system of claim 6, wherein the computation unit includes a static air temperature module operatively connected to the speed of sound module to receive the speed of sound data to determine a static air temperature based on the speed of sound, and to output a static air temperature signal.

8. The airspeed sensor system of claim 2, wherein the computation unit includes a multiplexer between the one or more propagation measurement modules and at least one other module of the computation unit, the multiplexer configured to receive and multiplex the first propagation data, the second propagation data, and the third propagation data from the one or more propagation measurement modules.

9. The airspeed sensor system of claim 1, wherein two of the first radial distance, the second radial distance, or the third radial distance are equivalent.

10. The airspeed sensor system of claim 1, wherein at least one of the first acoustic receiver, the second acoustic receiver, or the third acoustic receiver comprise microelectro-mechanical system microphones.

11. The airspeed sensor system of claim 1, wherein the computation unit is configured to determine if an acoustic receiver is shadowed by setting a maximum time for response, and to ignore one or more signals from the shadowed acoustic receivers.

12. The acoustic airspeed sensor system of claim 1, wherein the processor uses a beamforming algorithm.

13. The acoustic airspeed sensor system of claim 12, wherein the beamforming algorithm comprises a Classical algorithm, a Capon algorithm, a MUSIC algorithm, a root-MUSIC algorithm, a Bartlett algorithm, an ESPIRIT algorithm, a Min-Norm algorithm, a Burg algorithm, a SAMV algorithm, a Welch algorithm, a Time-Reversal MUSIC algorithm, a MVDR algorithm, an Akaike Information Criteria algorithm, or a Minimum Descriptive Length (MDL) Criteria algorithm.

14. The system of claim 1, wherein the at least one acoustic transmitter and the at least one of the plurality of acoustic receivers are configured as flush mounted on a surface of an aircraft.

15. A computer implemented method, comprising:
emitting an acoustic pulse using at least one acoustic transmitter;
receiving, at a first time, the acoustic pulse using a first acoustic receiver positioned at a first radial distance from the at least one acoustic transmitter;
providing a first receiver signal from the first acoustic receiver in response to receiving the acoustic pulse;
receiving, at a second time, the acoustic pulse using a second acoustic receiver positioned at a second radial distance from the at least one acoustic transmitter;
providing a second receiver signal from the second acoustic receiver in response to receiving the acoustic pulse;
receiving, at a third time, the acoustic pulse using a third acoustic receiver positioned at a third radial distance from the at least one acoustic transmitter;
providing a third receiver signal from the third acoustic receiver in response to receiving the acoustic pulse;
determining a first propagation time between receiving the first receiver signal and transmission of the acoustic pulse by the at least one acoustic transmitter;
determining a second propagation time between receiving the second receiver signal and transmission of the acoustic pulse by the at least one acoustic transmitter;
determining a third propagation time between receiving the third receiver signal and transmission of the acoustic pulse by the at least one acoustic transmitter;
constructing a propagation function based on at least one of:
a location of the at least one acoustic transmitter relative to at least one of the first receiver, the second receiver, or the third receiver;
an amplitude of the at least one of the first receiver signal, the second receiver signal, or the third receiver signal; or
a phase of the at least one of the first receiver signal, the second receiver signal, or the third receiver signal;
receiving or determining a wind angle; and
determining an air speed based on the propagation function and at least one of the first propagation time, the second propagation time, the third propagation time or the wind angle, and output an airspeed signal indicative of the airspeed.

* * * * *